US012718494B2

(12) United States Patent
Vaish et al.

(10) Patent No.: US 12,718,494 B2
(45) Date of Patent: Aug. 25, 2026

(54) MULTI-DIMENSIONAL EXPERIENCE PRESENTATION USING AUGMENTED REALITY

(71) Applicant: Snap Inc., Santa Monica, CA (US)

(72) Inventors: Rajan Vaish, Beverly Hills, CA (US); Sven Kratz, Mercer Island, WA (US); Andrés Monroy-Hernández, Princeton, NJ (US); Brian Anthony Smith, New York, NY (US)

(73) Assignee: Snap Inc., Santa Monica, CA (US)

(*) Notice: Subject to any disclaimer, the term of this patent is extended or adjusted under 35 U.S.C. 154(b) by 9 days.

(21) Appl. No.: 18/169,631

(22) Filed: Feb. 15, 2023

(65) Prior Publication Data

US 2024/0071007 A1 Feb. 29, 2024

Related U.S. Application Data

(60) Provisional application No. 63/402,897, filed on Aug. 31, 2022.

(51) Int. Cl.
*G06T 19/00* (2011.01)
*H04N 5/268* (2006.01)

(52) U.S. Cl.
CPC .......... *G06T 19/006* (2013.01); *H04N 5/268* (2013.01); *G06T 2200/24* (2013.01)

(58) Field of Classification Search
CPC ... G06T 19/006; G06T 2200/24; H04N 5/268; G06F 3/011
See application file for complete search history.

(56) References Cited

U.S. PATENT DOCUMENTS 4,807,158 A * 2/1989 Blanton ................ G09B 9/301 345/581
6,038,295 A 3/2000 Mattes
(Continued)

FOREIGN PATENT DOCUMENTS

CA 2887596 A1 7/2015
CN 105912129 A 8/2016
(Continued)

OTHER PUBLICATIONS

US 10,656,660 B1, 05/2020, Meisenholder et al. (withdrawn)
(Continued)

*Primary Examiner* — Motilewa Good-Johnson
(74) *Attorney, Agent, or Firm* — Schwegman Lundberg & Woessner, P.A.

(57) ABSTRACT

The present disclosure relates to methods and systems for providing a presentation of an experience (e.g., a journey) to a user using augmented reality (AR). During a capture phase, persons in the journey may take videos or pictures using their smartphones, GoPros, and/or smart glasses. A drone may also take videos or pictures during the journey. During an experience phase, an AR topographical rendering of the real-world environment of the journey may be rendered on a tabletop, highlighting/animating a path persons took in the journey. The persons may be rendered as miniature avatars/dolls overlaid on the representation of the real-world environment. When the user clicks on a point in the presentation of the journey, a perspective (e.g., the videos or pictures) at that point is presented.

18 Claims, 15 Drawing Sheets

(56) References Cited

U.S. PATENT DOCUMENTS 6,430,997 B1 8/2002 French et al.
6,819,982 B2 11/2004 Doane
6,980,909 B2 12/2005 Root et al.
7,173,651 B1 2/2007 Knowles
7,190,496 B2 * 3/2007 Klug ..................... G03H 1/268 359/9
7,411,493 B2 8/2008 Smith
7,535,890 B2 5/2009 Rojas
7,542,073 B2 6/2009 Li et al.
8,046,719 B2 10/2011 Skourup et al.
8,131,597 B2 3/2012 Hudetz
8,174,562 B2 5/2012 Hartman
8,199,747 B2 6/2012 Rojas et al.
8,274,550 B2 9/2012 Steuart, III
8,332,475 B2 12/2012 Rosen et al.
8,608,563 B2 12/2013 Miyazaki et al.
8,646,720 B2 2/2014 Shaw
8,718,333 B2 5/2014 Wolf et al.
8,724,622 B2 5/2014 Rojas
8,812,954 B2 8/2014 Shuster et al.
8,874,677 B2 10/2014 Rosen et al.
8,909,679 B2 12/2014 Root et al.
8,934,015 B1 * 1/2015 Chi ...................... G06F 16/955 348/158
8,995,433 B2 3/2015 Rojas
9,040,574 B2 5/2015 Wang et al.
9,055,416 B2 6/2015 Rosen et al.
9,100,806 B2 8/2015 Rosen et al.
9,100,807 B2 8/2015 Rosen et al.
9,186,548 B2 11/2015 House et al.
9,191,776 B2 11/2015 Root et al.
9,204,252 B2 12/2015 Root
9,235,932 B2 1/2016 Choi et al.
9,294,757 B1 3/2016 Lewis et al.
9,344,642 B2 5/2016 Niemi et al.
9,345,711 B2 5/2016 Friedhoff
9,443,227 B2 9/2016 Evans et al.
9,445,081 B1 9/2016 Kouperman et al.
9,471,059 B1 10/2016 Wilkins
9,489,661 B2 11/2016 Evans et al.
9,489,937 B1 11/2016 Beard et al.
9,491,134 B2 11/2016 Rosen et al.
9,551,873 B2 1/2017 Zalewski
9,576,369 B2 2/2017 Venkataraman et al.
9,582,166 B2 * 2/2017 Vaittinen ............ G01C 21/3647
9,586,147 B2 * 3/2017 Bathiche ............. A63F 13/5255
9,586,166 B2 * 3/2017 Coulonvaux ...... B01D 46/0005
9,589,448 B1 3/2017 Schneider et al.
9,681,046 B2 6/2017 Adsumilli et al.
9,703,369 B1 7/2017 Mullen
9,723,272 B2 8/2017 Lu et al.
9,747,901 B1 8/2017 Gentry
9,761,057 B2 9/2017 Salter et al.
9,779,538 B2 10/2017 Sanders et al.
9,794,527 B1 * 10/2017 Balez ................... G02B 27/017
9,818,225 B2 11/2017 Wang et al.
9,916,673 B2 * 3/2018 Castro ................... G06F 3/0488
9,922,659 B2 3/2018 Bradlow et al.
9,989,965 B2 6/2018 Cuban et al.
10,061,328 B2 8/2018 Canoy et al.
10,109,224 B1 10/2018 Ratti et al.
10,140,987 B2 11/2018 Erickson et al.
10,168,700 B2 1/2019 Gordon et al.
10,257,490 B2 * 4/2019 Khalid ................. H04N 23/698
10,282,903 B1 5/2019 Clark et al.
10,289,193 B2 5/2019 Hardy et al.
10,313,481 B2 6/2019 Kada
10,325,410 B1 6/2019 Smith et al.
10,365,784 B2 7/2019 Inomata
10,370,118 B1 8/2019 Nielsen et al.
10,403,050 B1 9/2019 Beall et al.
10,445,925 B2 10/2019 Tokubo
10,445,940 B2 10/2019 Guay et al.
10,482,665 B2 * 11/2019 Copic .................... G06F 3/011
10,501,180 B2 12/2019 Yu
10,504,277 B1 12/2019 Haitani et al.
10,581,940 B1 3/2020 Iyer et al.
10,599,286 B2 3/2020 Inomata
10,616,663 B2 4/2020 Davisson et al.
10,768,639 B1 9/2020 Meisenholder et al.
10,768,776 B1 9/2020 Roche et al.
10,796,489 B1 10/2020 Cordes et al.
10,819,946 B1 10/2020 Tanumihardja et al.
10,901,215 B1 1/2021 Newcombe et al.
10,921,878 B2 2/2021 Noris et al.
10,937,239 B2 * 3/2021 Huston .................. A63F 13/00
11,006,095 B2 * 5/2021 Holzer ................... G06T 17/00
11,051,049 B2 * 6/2021 Bustamante .......... H04L 67/131
11,062,517 B2 7/2021 Crews et al.
11,094,127 B2 8/2021 Mccall
11,126,206 B2 9/2021 Meisenholder et al.
11,145,123 B1 10/2021 Chor et al.
11,156,830 B2 10/2021 Johnson et al.
11,163,358 B2 11/2021 Marks et al.
11,194,439 B2 12/2021 Laaksonen et al.
11,200,028 B2 12/2021 Newell et al.
11,200,742 B1 12/2021 Post et al.
11,302,077 B2 4/2022 Kang et al.
11,361,473 B1 6/2022 Abdollahian et al.
11,372,474 B2 6/2022 Schweet et al.
11,413,514 B2 8/2022 Marty et al.
11,436,806 B1 9/2022 Katz
11,468,605 B2 10/2022 Corson
11,481,423 B1 10/2022 Singleton
11,481,980 B2 10/2022 Yerli
11,495,004 B1 11/2022 Henry
11,521,359 B2 * 12/2022 Noorkami .............. G06V 20/00
11,559,746 B1 1/2023 Caballero et al.
11,623,138 B2 4/2023 Yeh et al.
11,734,905 B1 8/2023 Henry
11,769,299 B1 9/2023 Stehlik et al.
11,847,749 B2 * 12/2023 Lebeaupin ........... G09B 29/106
11,861,799 B2 1/2024 Laaksonen et al.
11,868,526 B2 * 1/2024 Gutensohn .............. G06F 3/012
11,941,764 B2 * 3/2024 Harding .................. G06T 15/00
11,972,521 B2 4/2024 Vaish et al.
12,109,494 B1 10/2024 Ives et al.
12,145,058 B2 11/2024 Lehtiniemi et al.
12,267,482 B2 4/2025 Vaish et al.
12,282,604 B2 4/2025 Vaish et al.
12,322,052 B2 6/2025 Kratz et al.
12,449,891 B2 10/2025 Vaish et al.
12,519,924 B2 1/2026 Vaish et al.
2001/0045780 A1 11/2001 Gottlieb et al.
2004/0135890 A1 7/2004 Kaneko et al.
2006/0287025 A1 12/2006 French
2007/0167689 A1 7/2007 Ramadas et al.
2007/0196809 A1 8/2007 Sen
2007/0250526 A1 10/2007 Hanna
2008/0081676 A1 4/2008 Chakraborty et al.
2008/0158256 A1 * 7/2008 Russell ..................... G06T 7/32 345/629
2008/0168411 A1 7/2008 Mang et al.
2008/0186255 A1 * 8/2008 Cohen ................... G06F 3/0321 345/179
2008/0211771 A1 9/2008 Richardson
2008/0255842 A1 10/2008 Simhi
2008/0262911 A1 10/2008 Altberg et al.
2008/0263459 A1 10/2008 Altberg et al.
2009/0112538 A1 4/2009 Anderson et al.
2009/0122133 A1 5/2009 Hartman
2009/0171902 A1 * 7/2009 MacLaurin ............ G06Q 10/10
2009/0187389 A1 7/2009 Dobbins et al.
2009/0213114 A1 8/2009 Dobbins et al.
2010/0026809 A1 * 2/2010 Curry .................. H04N 23/698 348/157
2010/0030660 A1 2/2010 Edwards
2010/0060662 A1 3/2010 Law
2010/0078016 A1 4/2010 Jourdain et al.
2010/0125799 A1 5/2010 Roberts et al.
2010/0185984 A1 * 7/2010 Wright .................... G06F 16/29 715/833
2010/0260422 A1 10/2010 Ito et al.
2011/0179313 A1 7/2011 Macdonald et al.

(56) References Cited

U.S. PATENT DOCUMENTS

2011/0202598 A1 8/2011 Evans et al.
2011/0214082 A1* 9/2011 Osterhout ............ G02B 27/017 715/773
2011/0242134 A1 10/2011 Miller et al.
2011/0261083 A1 10/2011 Wilson
2012/0027278 A1 2/2012 Chaney et al.
2012/0052947 A1 3/2012 Yun
2012/0131125 A1 5/2012 Seidel et al.
2012/0188452 A1 7/2012 Keiser et al.
2012/0194420 A1 8/2012 Osterhout et al.
2012/0209924 A1 8/2012 Evans et al.
2012/0263154 A1 10/2012 Blanchflower et al.
2012/0281885 A1 11/2012 Syrdal et al.
2012/0287274 A1 11/2012 Bevirt
2012/0320169 A1 12/2012 Bathiche
2013/0056581 A1 3/2013 Sparks
2013/0072296 A1 3/2013 Miyazaki et al.
2013/0083009 A1* 4/2013 Geisner ................... A63F 13/52 345/419
2013/0083173 A1 4/2013 Geisner et al.
2013/0135315 A1 5/2013 Bares et al.
2013/0162632 A1* 6/2013 Varga ................... H04N 13/383 345/419
2013/0238168 A1 9/2013 Reyes
2014/0013228 A1* 1/2014 Hutten ............ H04N 21/23424 715/720
2014/0038708 A1 2/2014 Davison et al.
2014/0058807 A1 2/2014 Altberg et al.
2014/0254896 A1 9/2014 Zhou et al.
2014/0285522 A1 9/2014 Kim et al.
2014/0357366 A1 12/2014 Koganezawa et al.
2014/0368542 A1 12/2014 Tawara et al.
2015/0015486 A1 1/2015 Osman et al.
2015/0015608 A1 1/2015 Park
2015/0016777 A1 1/2015 Abovitz et al.
2015/0022432 A1 1/2015 Stewart et al.
2015/0035862 A1 2/2015 Fischer et al.
2015/0070272 A1 3/2015 Kim et al.
2015/0168497 A1 6/2015 Tabatowski-Bush
2015/0175263 A1 6/2015 Reyes
2015/0193979 A1 7/2015 Grek
2015/0199022 A1 7/2015 Gottesman et al.
2015/0287246 A1* 10/2015 Huston ................... G06T 17/00 345/420
2015/0331490 A1 11/2015 Yamada
2015/0355711 A1 12/2015 Rihn
2015/0362917 A1 12/2015 Wang et al.
2015/0363034 A1 12/2015 Hinckley et al.
2016/0004390 A1 1/2016 Laska et al.
2016/0027218 A1 1/2016 Salter et al.
2016/0049003 A1 2/2016 Shuster et al.
2016/0063987 A1 3/2016 Xu et al.
2016/0071548 A1 3/2016 House et al.
2016/0093108 A1 3/2016 Mao et al.
2016/0133230 A1 5/2016 Daniels et al.
2016/0161946 A1 6/2016 Wuth Sepulveda et al.
2016/0179096 A1 6/2016 Bradlow et al.
2016/0217623 A1 7/2016 Singh
2016/0292575 A1 10/2016 Weast et al.
2016/0292886 A1 10/2016 Erad et al.
2016/0307335 A1 10/2016 Perry et al.
2016/0307573 A1 10/2016 Wobrock
2016/0330532 A1 11/2016 Bostick et al.
2016/0336020 A1 11/2016 Bradlow et al.
2016/0350973 A1 12/2016 Shapira et al.
2016/0357258 A1 12/2016 Yeom et al.
2017/0031369 A1 2/2017 Liu et al.
2017/0039765 A1 2/2017 Zhou et al.
2017/0061700 A1 3/2017 Urbach et al.
2017/0084051 A1* 3/2017 Weising .................... G06T 7/20
2017/0094259 A1 3/2017 Kouperman et al.
2017/0099424 A1 4/2017 Jones
2017/0102699 A1 4/2017 Anderson
2017/0160815 A1 6/2017 Glazier et al.
2017/0177925 A1 6/2017 Volkart
2017/0208103 A1 7/2017 Sarmova
2017/0225796 A1 8/2017 Sun et al.
2017/0228690 A1 8/2017 Kohli
2017/0237940 A1 8/2017 Chaney et al.
2017/0244937 A1 8/2017 Meier et al.
2017/0256040 A1 9/2017 Grauer
2017/0266554 A1 9/2017 Marks et al.
2017/0269685 A1 9/2017 Marks et al.
2017/0316606 A1 11/2017 Khalid et al.
2017/0318275 A1 11/2017 Khalid et al.
2017/0320564 A1 11/2017 Kuzikov
2017/0323481 A1 11/2017 Tran et al.
2017/0324841 A1 11/2017 Clement et al.
2017/0329488 A1 11/2017 Welker et al.
2017/0337791 A1 11/2017 Gordon-carroll
2017/0359624 A1* 12/2017 Englert ............ H04N 21/25435
2017/0364153 A1 12/2017 Kazansky et al.
2017/0365098 A1* 12/2017 Auten ................... G06T 19/006
2017/0365102 A1 12/2017 Huston et al.
2017/0371353 A1 12/2017 Millinger, III
2018/0005429 A1 1/2018 Osman et al.
2018/0042559 A1 2/2018 Cabrera, Jr. et al.
2018/0059783 A1 3/2018 Van Hoff et al.
2018/0082682 A1 3/2018 Erickson et al.
2018/0089842 A1 3/2018 Mizuno
2018/0098059 A1 4/2018 Valdivia et al.
2018/0130257 A1 5/2018 Moran
2018/0152660 A1 5/2018 Tanaka
2018/0154232 A1 6/2018 Gentil
2018/0190033 A1 7/2018 Barnett et al.
2018/0197324 A1 7/2018 Hanamoto
2018/0246529 A1 8/2018 Hu et al.
2018/0270427 A1 9/2018 Damstra et al.
2018/0288364 A1 10/2018 Virhiä
2018/0311585 A1 11/2018 Osman
2018/0329486 A1 11/2018 Williams et al.
2018/0330515 A1 11/2018 Stall et al.
2018/0350146 A1 12/2018 Gervasio et al.
2018/0350147 A1 12/2018 Lodato et al.
2018/0350406 A1 12/2018 Lodato et al.
2019/0005546 A1 1/2019 Chen et al.
2019/0005728 A1 1/2019 Leppanen et al.
2019/0011921 A1 1/2019 Wang et al.
2019/0035097 A1 1/2019 Smith
2019/0051046 A1 2/2019 Jin et al.
2019/0054379 A1 2/2019 Ackley et al.
2019/0073831 A1 3/2019 Kim
2019/0073832 A1 3/2019 Kim
2019/0083885 A1 3/2019 Yee
2019/0130599 A1 5/2019 Gebbie et al.
2019/0130631 A1 5/2019 Gebbie et al.
2019/0138260 A1 5/2019 Rogers et al.
2019/0138463 A1* 5/2019 Kurata ................... G06Q 50/01
2019/0172265 A1 6/2019 Cossairt et al.
2019/0180509 A1 6/2019 Laaksonen et al.
2019/0182471 A1 6/2019 Khalid et al.
2019/0188895 A1 6/2019 Miller, IV et al.
2019/0199993 A1 6/2019 Babu J D et al.
2019/0208189 A1 7/2019 Lau et al.
2019/0217189 A1 7/2019 Gutierrez et al.
2019/0262709 A1 8/2019 Nakamura et al.
2019/0278369 A1 9/2019 Ballard
2019/0325654 A1* 10/2019 Stisser .................... A63F 13/26
2019/0333261 A1 10/2019 Nakashima
2019/0339768 A1 11/2019 He et al.
2019/0358547 A1 11/2019 Mack et al.
2020/0020136 A1 1/2020 Hwang et al.
2020/0042160 A1 2/2020 Gabbi et al.
2020/0043235 A1 2/2020 Chapman et al.
2020/0051336 A1 2/2020 Ichikawa et al.
2020/0066043 A1 2/2020 Graham et al.
2020/0097077 A1 3/2020 Nguyen et al.
2020/0098179 A1* 3/2020 Gough ................... G09G 5/377
2020/0098191 A1 3/2020 Mccall
2020/0101372 A1* 4/2020 Drake ................... A63F 13/216
2020/0126257 A1 4/2020 Tauber
2020/0126290 A1 4/2020 Itakura
2020/0134911 A1 4/2020 Van Hoff et al.

(56) References Cited

U.S. PATENT DOCUMENTS

2020/0159361 A1 5/2020 Rosenberg et al.
2020/0162779 A1 5/2020 Saxena
2020/0169715 A1 5/2020 Liu et al.
2020/0171394 A1* 6/2020 Khan ...................... G06F 3/011
2020/0230497 A1 7/2020 Espinosa Baruque et al.
2020/0236346 A1 7/2020 Kato
2020/0241575 A1 7/2020 Meisenholder et al.
2020/0242840 A1 7/2020 Logan et al.
2020/0257367 A1 8/2020 Rihn et al.
2020/0260149 A1 8/2020 Ding et al.
2020/0264945 A1 8/2020 Gangopadhyay et al.
2020/0273243 A1 8/2020 Duffy et al.
2020/0279407 A1 9/2020 Liljeroos et al.
2020/0289935 A1 9/2020 Azmandian et al.
2020/0289941 A1 9/2020 Khan et al.
2020/0314323 A1 10/2020 Van Geel et al.
2020/0341541 A1 10/2020 Olah-Reiken et al.
2020/0349751 A1 11/2020 Bentovim et al.
2020/0366878 A1 11/2020 Hanamoto
2020/0371737 A1 11/2020 Leppänen et al.
2020/0387288 A1 12/2020 Ito
2020/0394012 A1 12/2020 Wright, Jr. et al.
2020/0409451 A1 12/2020 Mukherjea et al.
2021/0096543 A1 4/2021 Stump et al.
2021/0142578 A1 5/2021 Weinheimer et al.
2021/0144404 A1 5/2021 Aflaki Beni et al.
2021/0159980 A1 5/2021 Ben-Yehuda et al.
2021/0232632 A1 7/2021 Howard
2021/0272367 A1* 9/2021 Richter .................. G06F 3/011
2021/0279962 A1 9/2021 Hutten et al.
2021/0286179 A1 9/2021 Miller, IV et al.
2021/0287452 A1 9/2021 Maruyama
2021/0289317 A1 9/2021 Son et al.
2021/0312684 A1 10/2021 Zimmermann et al.
2021/0327145 A1 10/2021 Noorkami et al.
2021/0358294 A1 11/2021 Parashar et al.
2021/0362848 A1 11/2021 Spencer
2021/0374579 A1 12/2021 Dotan-Cohen et al.
2021/0382503 A1 12/2021 Meisenholder et al.
2021/0390953 A1 12/2021 Makker et al.
2021/0394046 A1 12/2021 Yen et al.
2021/0405772 A1 12/2021 Canberk et al.
2021/0407178 A1 12/2021 Zhou et al.
2021/0407208 A1 12/2021 Hariton
2021/0409502 A1 12/2021 Chepizhenko et al.
2022/0014723 A1 1/2022 Pandey et al.
2022/0028108 A1 1/2022 Haapoja et al.
2022/0028170 A1 1/2022 Haapoja et al.
2022/0044704 A1 2/2022 Newell et al.
2022/0051469 A1 2/2022 Yoneda
2022/0053219 A1 2/2022 Bathory
2022/0075591 A1* 3/2022 Cardenas Gasca .... G06V 40/10
2022/0101593 A1 3/2022 Rockel et al.
2022/0103969 A1 3/2022 Drummond et al.
2022/0108539 A1 4/2022 Nussbaum et al.
2022/0116581 A1* 4/2022 Miyata ...................... G06T 7/73
2022/0124143 A1 4/2022 Rafkind et al.
2022/0139055 A1 5/2022 Palmaro
2022/0141440 A1 5/2022 Arai
2022/0146833 A1 5/2022 Miller, IV et al.
2022/0164491 A1 5/2022 Palmaro
2022/0189075 A1 6/2022 Lynch et al.
2022/0197485 A1 6/2022 Goodrich et al.
2022/0198603 A1 6/2022 Goodrich et al.
2022/0230663 A1 7/2022 Sun et al.
2022/0242450 A1 8/2022 Sokolov et al.
2022/0244835 A1 8/2022 Faulkner et al.
2022/0247929 A1 8/2022 Yang et al.
2022/0269336 A1 8/2022 Lafontaine et al.
2022/0274026 A1 9/2022 Steigelfest et al.
2022/0277565 A1 9/2022 Haro
2022/0345680 A1 10/2022 Aoki et al.
2022/0362631 A1 11/2022 Hong
2022/0382255 A1 12/2022 Lee
2022/0392169 A1 12/2022 Simpson et al.
2023/0009185 A1 1/2023 Furukawa
2023/0010754 A1 1/2023 Saxena
2023/0033201 A1 2/2023 Ogasawara
2023/0063505 A1 3/2023 Chastain et al.
2023/0068042 A1 3/2023 Lehrich et al.
2023/0085590 A1 3/2023 Tamura et al.
2023/0097571 A1 3/2023 Mccain et al.
2023/0139337 A1 5/2023 Noam et al.
2023/0173367 A1 6/2023 Marty et al.
2023/0179641 A1* 6/2023 Bauer ................. H04L 65/1093
709/227
2023/0214005 A1 7/2023 Ohashi
2023/0214082 A1 7/2023 Kang
2023/0224451 A1 7/2023 Irie et al.
2023/0237192 A1 7/2023 Kahan et al.
2023/0316681 A1 10/2023 Dolev et al.
2023/0334754 A1 10/2023 Kirchmayer et al.
2023/0341928 A1 10/2023 Traynor et al.
2023/0342989 A1 10/2023 Lehtiniemi et al.
2023/0360442 A1 11/2023 Soryal et al.
2023/0409114 A1 12/2023 Sun et al.
2023/0412480 A1* 12/2023 Greyson ............. H04L 43/0817
2024/0005623 A1 1/2024 Cooper et al.
2024/0015274 A1 1/2024 Aoki et al.
2024/0020919 A1 1/2024 Krueger
2024/0040106 A1 2/2024 Yoneda
2024/0069626 A1* 2/2024 Vaish ...................... G06F 3/011
2024/0069627 A1 2/2024 Vaish et al.
2024/0069637 A1 2/2024 Vaish et al.
2024/0070969 A1 2/2024 Vaish et al.
2024/0071004 A1* 2/2024 Vaish .................. G06F 16/2477
2024/0071006 A1 2/2024 Kratz et al.
2024/0071008 A1 2/2024 Vaish et al.
2024/0073402 A1 2/2024 Vaish et al.
2024/0073404 A1 2/2024 Vaish et al.
2024/0078687 A1 3/2024 Arai
2024/0119679 A1* 4/2024 Canberk ............... G06T 19/006
2024/0119682 A1 4/2024 Rudman et al.
2024/0233224 A1 7/2024 Fan et al.
2024/0242443 A1 7/2024 Nallabolu et al.
2024/0273832 A1 8/2024 Newman et al.
2024/0338899 A1 10/2024 Watanabe
2024/0355069 A1 10/2024 Lim et al.
2024/0420439 A1 12/2024 Yoneda
2024/0428455 A1 12/2024 Onuma
2025/0037322 A1 1/2025 Yoneda
2025/0184471 A1 6/2025 Vaish et al.
2025/0211720 A1 6/2025 Ichihashi et al.
2025/0216951 A1 7/2025 Lortie et al.
2025/0252686 A1 8/2025 Kratz et al.
2025/0363757 A1 11/2025 Vaish et al.
2026/0016885 A1 1/2026 Vaish et al.
2026/0089308 A1 3/2026 Vaish et al.

FOREIGN PATENT DOCUMENTS

CN 119790370 A 4/2025
JP 2010061452 3/2010
KR 20200014587 A 2/2020
KR 20200109812 A 9/2020
KR 20210065423 A 6/2021
KR 20210135859 A 11/2021
KR 20220064130 A 5/2022
WO WO-2016105839 A1 6/2016
WO WO-2021002788 A1 1/2021
WO 2024050264 3/2024
WO WO-2024049687 A1 3/2024
WO WO-2024049700 A1 3/2024
WO WO-2024050229 A1 3/2024
WO WO-2024050231 A1 3/2024
WO WO-2024050232 A1 3/2024
WO WO-2024050245 A1 3/2024
WO WO-2024050246 A1 3/2024
WO WO-2024050259 A1 3/2024

(56) References Cited

FOREIGN PATENT DOCUMENTS

WO WO-2024050262 A1 3/2024
WO WO-2024050264 A9 3/2025

OTHER PUBLICATIONS

Laput, Gierad, et al., "PixelTone: A Multimodal Interface for Image Editing", ACM, Proceedings of the SIGCHI Conference on Human Factors in Computing Systems, Paris, FR, (2013), 10 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Meisenholder, David, et al., "Remoteless Control of Drone Behavior", U.S. Appl. No. 15/640,143, filed Jun. 30, 2017, 108 pgs.
Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.
Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.
"International Application Serial No. PCT US2023 072726, International Search Report mailed Dec. 12, 2023", 3 pgs.
"International Application Serial No. PCT US2023 072726, Written Opinion mailed Dec. 12, 2023", 4 pgs.
"U.S. Appl. No. 17/899,935, Final Office Action mailed Jan. 10, 2025", 13 pgs.
"U.S. Appl. No. 17/899,935, Non Final Office Action mailed Apr. 17, 2025", 14 pgs.
"U.S. Appl. No. 17/899,935, Non Final Office Action mailed Jun. 6, 2024", 13 pgs.
"U.S. Appl. No. 17/899,935, Response filed Apr. 9, 2025 to Final Office Action mailed Jan. 10, 2025", 10 pgs.
"U.S. Appl. No. 17/899,935, Response filed Oct. 7, 2024 to Non Final Office Action mailed Jun. 6, 2024", 11 pgs.
"U.S. Appl. No. 17/899,970, Corrected Notice of Allowability mailed Jan. 3, 2024", 5 pgs.
"U.S. Appl. No. 17/899,970, Non Final Office Action mailed Jul. 3, 2023", 22 pgs.
"U.S. Appl. No. 17/899,970, Notice of Allowance mailed Dec. 20, 2023", 9 pgs.
"U.S. Appl. No. 17/899,970, PTO Response to Rule 312 Communication mailed Mar. 27, 2024", 1 page.
"U.S. Appl. No. 17/899,970, Response filed Oct. 3, 2023 to Non Final Office Action mailed Jul. 3, 2023", 11 pgs.
"U.S. Appl. No. 17/899,970, Supplemental Notice of Allowability mailed Mar. 27, 2024", 2 pgs.
"U.S. Appl. No. 17/900,200, Final Office Action mailed Mar. 3, 2025", 39 pgs.
"U.S. Appl. No. 17/900,200, Final Office Action mailed May 6, 2024", 32 pgs.
"U.S. Appl. No. 17/900,200, Non Final Office Action mailed Aug. 29, 2024", 35 pgs.
"U.S. Appl. No. 17/900,200, Non Final Office Action mailed Nov. 8, 2023", 26 pgs.
"U.S. Appl. No. 17/900,200, Response filed Jan. 31, 2024 to Non Final Office Action mailed Nov. 8, 2023", 14 pgs.
"U.S. Appl. No. 17/900,200, Response filed Aug. 6, 2024 to Final Office Action mailed May 6, 2024", 13 pgs.
"U.S. Appl. No. 17/900,200, Response filed Nov. 27, 2024 to Non Final Office Action mailed Aug. 29, 2024", 13 pgs.
"U.S. Appl. No. 17/900,354, Non Final Office Action mailed Dec. 12, 2024", 17 pgs.
"U.S. Appl. No. 17/900,354, Response filed Mar. 12, 2025 to Non Final Office Action mailed Dec. 12, 2024", 10 pgs.
"U.S. Appl. No. 17/900,407, Advisory Action mailed Oct. 30, 2024", 3 pgs.
"U.S. Appl. No. 17/900,407, Examiner Interview Summary mailed Apr. 15, 2024", 2 pgs.
"U.S. Appl. No. 17/900,407, Final Office Action mailed Aug. 21, 2024", 14 pgs.
"U.S. Appl. No. 17/900,407, Non Final Office Action mailed Feb. 9, 2024", 11 pgs.
"U.S. Appl. No. 17/900,407, Notice of Allowance mailed Nov. 27, 2024", 8 pgs.
"U.S. Appl. No. 17/900,407, Response filed Apr. 23, 2024 to Non Final Office Action mailed Feb. 9, 2024", 12 pgs.
"U.S. Appl. No. 17/900,407, Response filed Oct. 18, 2024 to Final Office Action mailed Aug. 21, 2024", 12 pgs.
"U.S. Appl. No. 17/900,436, Examiner Interview Summary mailed Jan. 3, 2025", 2 pgs.
"U.S. Appl. No. 17/900,436, Final Office Action mailed Apr. 10, 2025", 14 pgs.
"U.S. Appl. No. 17/900,436, Non Final Office Action mailed Sep. 23, 2024", 12 pgs.
"U.S. Appl. No. 17/900,436, Response filed Dec. 20, 2024 to Non Final Office Action mailed Sep. 23, 2024", 12 pgs.
"U.S. Appl. No. 18/056,142, Corrected Notice of Allowability mailed Mar. 12, 2025", 2 pgs.
"U.S. Appl. No. 18/056,142, Corrected Notice of Allowability mailed Mar. 26, 2025", 2 pgs.
"U.S. Appl. No. 18/056,142, Corrected Notice of Allowability mailed Sep. 4, 2024", 2 pgs.
"U.S. Appl. No. 18/056,142, Examiner Interview Summary mailed Nov. 7, 2023", 2 pgs.
"U.S. Appl. No. 18/056,142, Final Office Action mailed Apr. 8, 2024", 15 pgs.
"U.S. Appl. No. 18/056,142, Non Final Office Action mailed Aug. 7, 2023", 12 pgs.
"U.S. Appl. No. 18/056,142, Notice of Allowability mailed Dec. 31, 2024", 2 pgs.
"U.S. Appl. No. 18/056,142, Notice of Allowance mailed Aug. 16, 2024", 9 pgs.
"U.S. Appl. No. 18/056,142, Notice of Allowance mailed Dec. 11, 2024", 5 pgs.
"U.S. Appl. No. 18/056,142, Notice of Non-Compliant Amendment mailed Nov. 16, 2023", 2 pgs.
"U.S. Appl. No. 18/056,142, Response filed Jan. 3, 2024 to Notice of Non-Compliant Amendment mailed Nov. 16, 2023", 11 pgs.
"U.S. Appl. No. 18/056,142, Response filed Jul. 8, 24 to Final Office Action mailed Apr. 8, 24", 13 pgs.
"U.S. Appl. No. 18/056,142, Response filed Nov. 7, 2023 to Non Final Office Action mailed Aug. 7, 2023", 11 pgs.
"U.S. Appl. No. 18/058,175, Examiner Interview Summary mailed Jun. 7, 2024", 2 pgs.
"U.S. Appl. No. 18/058,175, Final Office Action mailed Sep. 19, 2024", 12 pgs.
"U.S. Appl. No. 18/058,175, Non Final Office Action mailed Mar. 11, 2024", 14 pgs.
"U.S. Appl. No. 18/058,175, Notice of Allowance mailed Jan. 30, 2025", 8 pgs.
"U.S. Appl. No. 18/058,175, Notice of Allowance mailed Nov. 15, 2024", 8 pgs.
"U.S. Appl. No. 18/058,175, Response filed Jun. 11, 2024 to Non Final Office Action mailed Mar. 11, 2024", 11 pgs.
"U.S. Appl. No. 18/058,175, Response filed Oct. 30, 2024 to Final Office Action mailed Sep. 19, 2024", 9 pgs.
"U.S. Appl. No. 18/170,271, Non Final Office Action mailed Nov. 29, 2024", 11 pgs.
"U.S. Appl. No. 18/170,271, Notice of Allowance mailed Feb. 4, 2025", 7 pgs.
"U.S. Appl. No. 18/170,271, Notice of Allowance mailed May 9, 2025", 7 pgs.
"U.S. Appl. No. 18/170,271, Response filed Jan. 6, 2025 to Non Final Office Action mailed Nov. 29, 2024", 10 pgs.
"U.S. Appl. No. 17/899,970, 312 Amendment filed Mar. 20, 2024", 7 pgs.
"International Application Serial No. PCT/US2023/030926, International Search Report mailed Dec. 12, 2023", 3 pgs.

(56) References Cited

OTHER PUBLICATIONS

"International Application Serial No. PCT/US2023/030926, Written Opinion mailed Dec. 12, 2023", 4 pgs.
"International Application Serial No. PCT/US2023/031066, International Search Report mailed Dec. 15, 2023", 3 pgs.
"International Application Serial No. PCT/US2023/031066, Written Opinion mailed Dec. 15, 2023", 3 pgs.
"International Application Serial No. PCT/US2023/072274, International Search Report mailed Nov. 28, 2023", 3 pgs.
"International Application Serial No. PCT/US2023/072274, Written Opinion mailed Nov. 28, 2023", 4 pgs.
"International Application Serial No. PCT/US2023/072277, International Search Report mailed Dec. 8, 2023", 4 pgs.
"International Application Serial No. PCT/US2023/072277, Written Opinion mailed Dec. 8, 2023", 4 pgs.
"International Application Serial No. PCT/US2023/072282, International Search Report mailed Dec. 1, 2023", 4 pgs.
"International Application Serial No. PCT/US2023/072282, Written Opinion mailed Dec. 1, 2023", 4 pgs.
"International Application Serial No. PCT/US2023/072557, International Search Report mailed Dec. 12, 2023", 3 pgs.
"International Application Serial No. PCT/US2023/072557, Written Opinion mailed Dec. 12, 2023", 4 pgs.
"International Application Serial No. PCT/US2023/072568, International Search Report mailed Dec. 5, 2023", 3 pgs.
"International Application Serial No. PCT/US2023/072568, Written Opinion mailed Dec. 5, 2023", 4 pgs.
"International Application Serial No. PCT/US2023/072701, International Search Report mailed Dec. 1, 2023", 3 pgs.
"International Application Serial No. PCT/US2023/072701, Written Opinion mailed Dec. 1, 2023", 4 pgs.
"International Application Serial No. PCT/US2023/072718, International Search Report mailed Dec. 1, 2023", 3 pgs.
"International Application Serial No. PCT/US2023/072718, Written Opinion mailed Dec. 1, 2023", 4 pgs.
"International Application Serial No. PCT/US2023/072726, International Preliminary Report on Patentability mailed Mar. 13, 2025", 6 pgs.
Ko, Jonggook, et al., "Hybrid Camera Based Real-Time Human Body Segmentation for Virtual Reality E-learning System", First ACIS JNU International Conference on Computers Networks Systems and Industrial Engineering Jeju Korea South, (2011), 3 pgs.
Langa, Sergi Fernandez, et al., "Multiparty Holomeetings Toward a New Era of Low Cost Volumetric Holographic Meetings in Virtual Reality", IEEE Access vol. 10, (Aug. 3, 2022), 21 pgs.
S. A., Aseeri, et al., "The Influence of Avatar Representation and Behavior on Communication in Social Immersive Virtual Environments", IEEE Conference on Virtual Reality and 3D User Interfaces VR Tuebingen Reutlingen Germany, (2018), 2 pgs.
Yanbin, Wang, et al., "Real Time Stereoscopic Rendering of Realistic Avatar for Interactive 3D Telepresence System", 2nd International Conference on Image Vision and Computing ICIVC Chengdu, (2017), 5 pgs.
"U.S. Appl. No. 17/899,935, Final Office Action mailed Aug. 27, 2025", 16 pgs.
"U.S. Appl. No. 17/899,935, Response filed Jul. 16, 2025 to Non Final Office Action mailed Apr. 17, 2025", 13 pgs.
"U.S. Appl. No. 17/900,200, Notice of Allowance mailed Sep. 4, 2025", 33 pgs.
"U.S. Appl. No. 17/900,200, Response filed Jul. 30, 2025 to Final Office Action mailed Mar. 3, 2025", 13 pgs.
"U.S. Appl. No. 17/900,354, Corrected Notice of Allowability mailed Jul. 2, 2025", 2 pgs.
"U.S. Appl. No. 17/900,354, Notice of Allowance mailed Jun. 24, 2025", 9 pgs.
"U.S. Appl. No. 17/900,436, Examiner Interview Summary mailed Jul. 16, 2025", 2 pgs.
"U.S. Appl. No. 17/900,436, Non Final Office Action mailed Jul. 29, 2025", 13 pgs.
"U.S. Appl. No. 17/900,436, Response filed Jul. 8, 2025 to Final Office Action mailed Apr. 10, 2025", 12 pgs.
"U.S. Appl. No. 18/170,271, Corrected Notice of Allowability mailed Aug. 21, 2025", 2 pgs.
U.S. Appl. No. 17/899,935, Advisory Action mailed Oct. 30, 2025, 3 pgs.
"U.S. Appl. No. 17/899,935, Examiner Interview Summary mailed Oct. 20, 2025", 2 pgs.
"U.S. Appl. No. 17/899,935, Non Final Office Action mailed Nov. 19, 2025", 16 pgs.
"U.S. Appl. No. 17/899,935, Response filed Feb. 19, 2026 to Non Final Office Action mailed Nov. 19, 2025", 12 pgs.
"U.S. Appl. No. 17/899,935, Response filed Oct. 24, 2025 to Final Office Action mailed Aug. 27, 2025", 13 pgs.
"U.S. Appl. No. 17/900,200, Supplemental Notice of Allowability mailed Dec. 4, 2025", 2 pgs.
"U.S. Appl. No. 17/900,436, Non Final Office Action mailed Jan. 27, 2026", 14 pgs.
"U.S. Appl. No. 17/900,436, Response filed Oct. 22, 2025 to Non Final Office Action mailed Jul. 29, 2025", 10 pgs.
"European Application Serial No. 23861440.8, Response to Communication pursuant to Rules 161(2) and 162 EPC filed Oct. 2, 2025", 15 pgs.
"Korean Application Serial No. 10-2025-7010455, Notice of Preliminary Rejection mailed Mar. 12, 2026", w English translation, 20 pgs.

* cited by examiner

MULTI-DIMENSIONAL EXPERIENCE PRESENTATION USING AUGMENTED REALITY

CROSS-REFERENCE TO RELATED APPLICATION

This application claims the benefit of priority to U.S. Provisional Patent Application No. 63/402,897, filed Aug. 31, 2022, and entitled "MULTI-DIMENSIONAL EXPERIENCE PRESENTATION USING AUGMENTED REALITY," which is herein incorporated by reference in its entirety.

TECHNICAL FIELD

The present disclosure generally relates to mobile and wearable computing technology. In particular, example embodiments of the present disclosure address systems, methods, and user interfaces for presenting a past experience to a user using Augmented Reality (AR).

BACKGROUND

An Augmented Reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. Examples of audio and visual content include pictures, texts, logos, animations, and sound effects. A device that supports AR experiences in any one of these approaches is referred to herein as an "AR device."

For some example AR devices, audio and visual content or the visual effects are applied to media data such as a live image stream. Other example AR devices include head-worn devices that may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. A user of the head-worn device may access and use a computer software application to perform various tasks or engage in an entertaining activity. To use the computer software application, the user interacts with a 3D user interface provided by the head-worn device.

The so-called "Internet of Things" or "IoT" is a network of physical objects (referred to as "IoT devices") that are embedded with sensors, software, and other technologies for enabling connection and exchange of data with other devices via the Internet. For example, IoT devices are used in home automation to control lighting, heating and air conditioning, media and security systems, and camera systems. A number of IoT-enabled devices have been provided that function as smart home hubs to connect different smart home products. IoT devices have been used in a number of other applications as well. Application layer protocols and supporting frameworks have been provided for implementing such IoT applications. Artificial intelligence has also been combined with the IoT infrastructure to achieve more efficient IoT operations, improve human-machine interactions, and enhance data management and analytics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
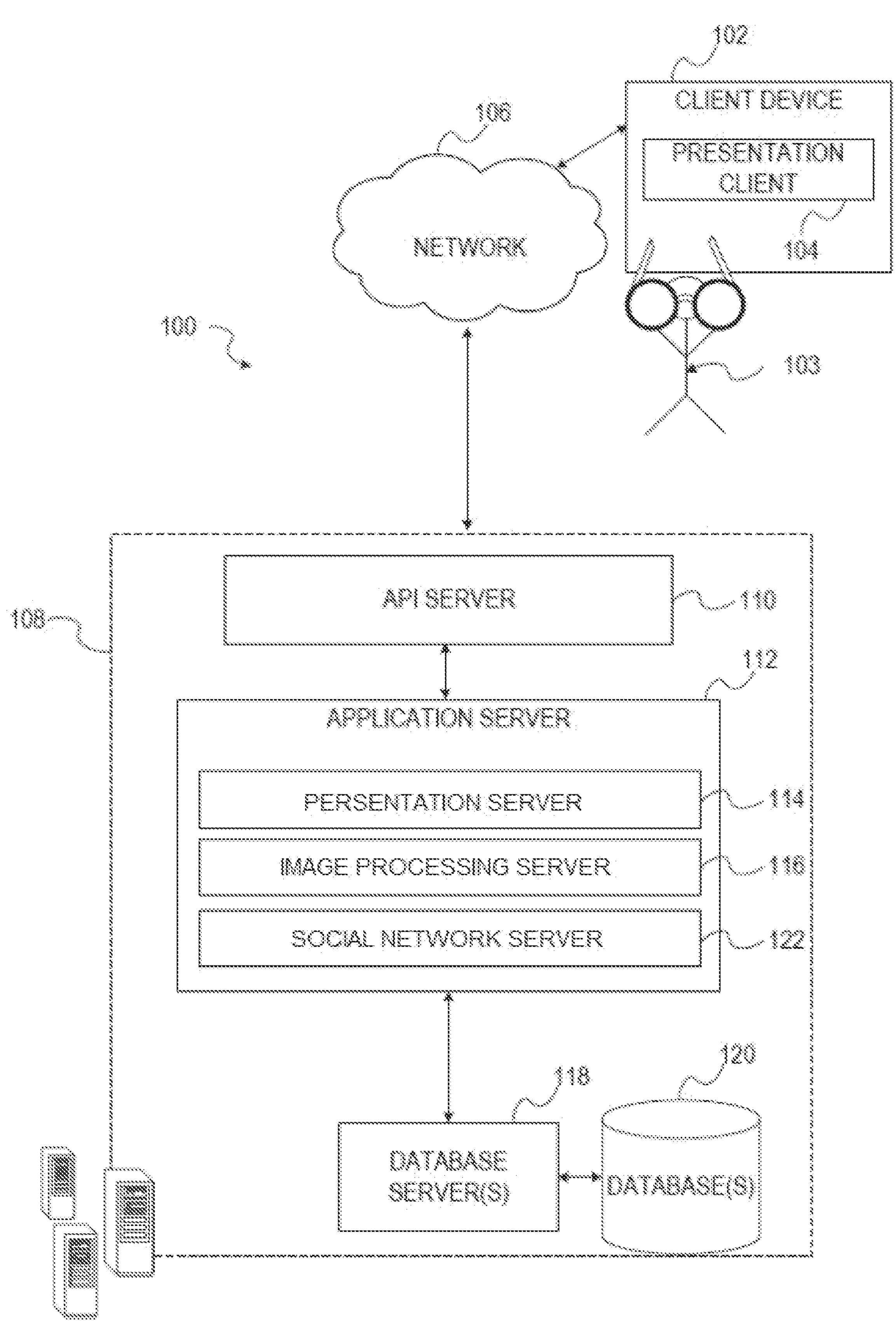
FIG. 1 is a diagrammatic representation of a networked environment in which a volumetric content presentation system may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Volumetric content is an example of an Augmented Reality (AR) experience. Volumetric content can include volumetric videos and images of three-dimensional spaces captured in three-dimensions (as well as audio signals recorded with volumetric videos and images). Recording of volumetric content includes volumetrically capturing elements of the three-dimensional space such as objects and human beings using a combination of cameras and sensors. Volumetric content includes a volumetric representation of one or more three-dimensional elements (e.g., an object or a person) of a three-dimensional space. A volumetric representation of an element (e.g., an AR content item) refers to a visual representation of the three-dimensional element in three-dimensions. The presentation of the volumetric content may include displaying one or more AR content items overlaid upon a real-world space, which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users.

Conventional presentation of volumetric content is typically limited to a visual representation of the background scene and cannot provide a presentation of foreground experience (e.g., a journey) in the scene. Aspects of the present disclosure include systems, methods, techniques, instruction sequences, and computing machine program products to provide a multi-dimensional presentation of recorded user experience using AR. The multi-dimensional presentation of the experience may include people involved in the experience, a real-world environment of the experience, and multiple points of interest associated with the experience. In some examples, the multi-dimensional presentation of the experience may further include multiple perspectives recorded at some or all of the multiple points of interest. When a user interacts with (e.g., select) the presented multiple points of interest, a corresponding perspective may be presented by the display device.

In an example of the foregoing, a hike between two friends is recorded and presented. During a capture phase, the two friends both wear or carry smart devices while hiking. Throughout the hike, the two friends may take videos and pictures using the smart devices and casually hike their way through the mountains. The smart devices may include but are not limited to a smart phone, a smart wristband, a smart watch, smart glasses, a camera mounted on a handheld stick, a smart helmet, or the like. Embedded cameras from the smart devices may capture multiple perspectives of the two friends at different points of interest. The smart devices may further include a drone that captures multiple perspectives at different points of interest or along the hike. After the hike, a presentation system presents an AR topographical rendering of the mountain on a tabletop with the path the friends took to reach the summit being visually highlighted. The presentation may further include representations of each of the two friends (e.g., miniature avatars). A viewing user clicking anywhere on the path may view a video taken at that point from the smart devices (e.g., the drone). The viewing user clicking on the avatar triggers presentation of a video from that person's perspective (captured using the embedded camera of the smart devices). Accordingly, with this manner of presentation, users may experience 1st, 2nd, and/or 3rd (aerial) person perspective of their experience. The presentation of the experience may also include a visualization of the friends' heart rates at specific moments (captured using smart watches). Images and videos generated during the hike can be highlighted by separate markers on the path. In addition, the presentation may further include a representation of weather conditions (clouds in AR over mountains for a cloudy day or animated wind in AR to indicate a windy day). By presenting the experience in this manner, the system allows users to relive experiences as if they were watching a dollhouse story.

FIG. 1 is a block diagram showing an example volumetric content presentation system 100 for presenting volumetric content. The volumetric content presentation system 100 includes of a client device 102. The client device 102 hosts a number of applications including a presentation client 104. Each presentation client 104 is communicatively coupled to a presentation server system 108 via a network 106 (e.g., the Internet). In an example, the client device 102 is a wearable device (e.g., smart glasses) worn by the user 103 that includes a camera and optical elements that include a transparent display through which the real-world environment is visible to the user 103.

A presentation client 104 is able to communicate and exchange data with another presentation client 104 and with the presentation server system 108 via the network 106. The data exchanged between the presentation client 104, and between another presentation client 104 and the presentation server system 108, includes functions (e.g., commands to invoke functions) as well as payload data (e.g., text, audio, video or other multimedia data).

The presentation server system 108 provides server-side functionality via the network 106 to a particular presentation client 104. While certain functions of the volumetric content presentation system 100 are described herein as being performed by either a presentation client 104 or by the presentation server system 108, the location of certain functionality either within the presentation client 104 or the presentation server system 108 is a design choice. For example, it may be technically preferable to initially deploy certain technology and functionality within the presentation server system 108, but to later migrate this technology and functionality to the presentation client 104 where the client device (102) has a sufficient processing capacity.

The presentation server system 108 supports various services and operations that are provided to the presentation client 104. Such operations include transmitting data to, receiving data from, and processing data generated by the presentation client 104. This data may include volumetric content (e.g., volumetric videos), message content, device information, geolocation information, media annotation and overlays, message content persistence conditions, social network information, and live event information, as examples. Data exchanges within the volumetric content presentation system 100 are invoked and controlled through functions available via user interfaces (UIs) and of the presentation client 104.

Turning now specifically to the presentation server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the API server 110 provides a set of interfaces (e.g., routines and protocols) that can be called or queried by the presentation client 104 in order to invoke functionality of the application server 112. The API server 110 exposes various functions supported by the application server 112, including account registration, login functionality, the sending of messages, via the application server 112, from a particular presentation client 104 to another presentation client 104, the sending of media files (e.g., volumetric videos) to the presentation client 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the presentation client 104).

The application server 112 hosts a number of applications and subsystems, including a presentation server 114, an image processing server 116 and a social network server 122. The presentation server 114 is generally responsible for managing volumetric content and facilitating presentation thereof by the client device 102. The image processing server 116 is dedicated to performing various image processing operations, typically with respect to images or video generated and displayed by the client device 102. The presentation server 114 and image processing server 116 may work in conjunction to provide one or more AR experiences to the user 103. For example, the presentation server 114 and image processing server 116 may work in conjunction to support presentation of volumetric content by the client device 102. Further details regarding presentation of volumetric content are discussed below.

The social network server 122 supports various social networking functions and services, and makes these functions and services available to the presentation server 114. To this end, the social network server 122 maintains and accesses an entity graph within the database 120. Examples of functions and services supported by the social network server 122 include the identification of other users of the volumetric content presentation system 100 with which a particular user has relationships or is "following", and also the identification of other entities and interests of a particular user.

The application server 112 is communicatively coupled to a database server 118, which facilitates access to a database 120 in which is stored data associated with content presented by the presentation server 114 and image processing server 116.

Figure 2A:
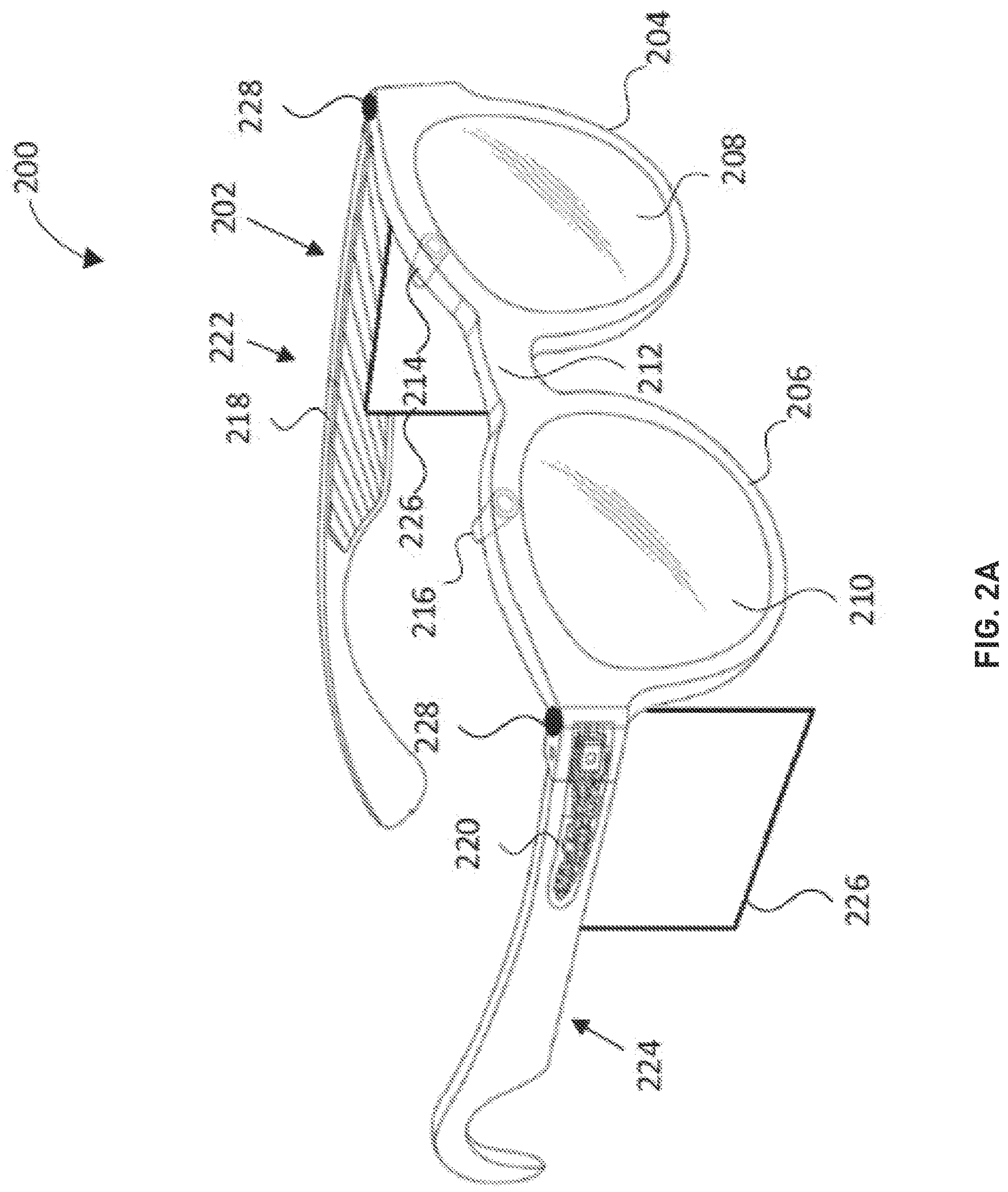
FIG. 2A is a perspective view of a head-worn device, in accordance with some example embodiments.

FIG. 2A is perspective view of a head-worn display device (e.g., glasses 200), in accordance with some examples. The glasses 200 are an example of the client device 102 of FIG. 1. The glasses 200 are capable of displaying content and are thus an example of a display device, which is referenced below. In addition, the display capabilities of the glasses 200 support AR experiences and the glasses 200 are thus an example of an AR device. As noted above, AR experiences include application of virtual content to real-world environments whether through presentation of the virtual content by transparent displays through which a real-world environment is visible or through augmenting image data to include the virtual content overlaid on real-world environments depicted therein.

The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. As discussed below, the computer 220 comprises low-power circuitry, high-speed circuitry, and a display processor. Various other examples may include these elements in different configurations or integrated together in different ways. Additional details of aspects of computer 220 may be implemented as illustrated by the data processor 302 discussed below.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide video frame data for use by the glasses 200 to extract 3D information from a real-world scene.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. Additional user input may be provided by one or more buttons 228, which in the illustrated examples are provided on the outer upper edges of the left optical element holder 204 and right optical element holder 206. The one or more touchpads 226 and buttons 228 provide a means whereby the glasses 200 can receive input from a user of the glasses 200.

Figure 2B:
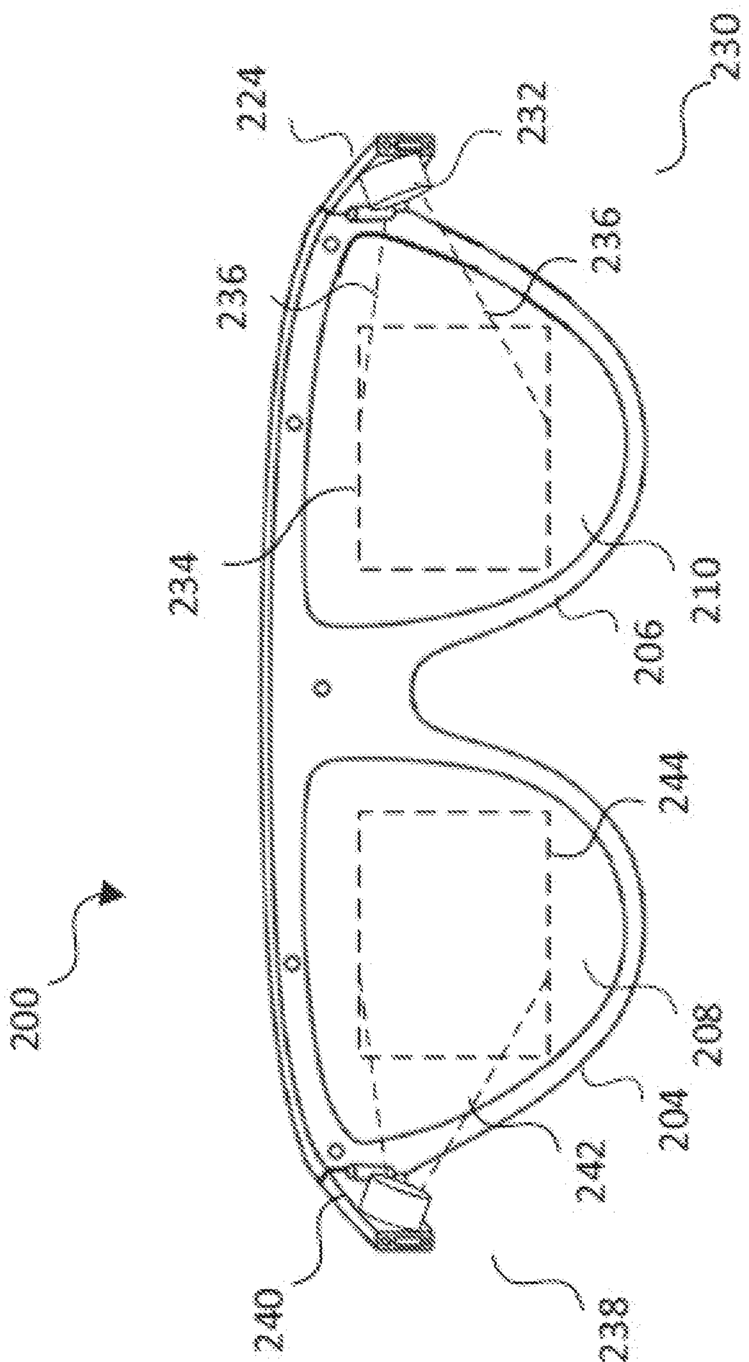
FIG. 2B illustrates a further view of the head-worn device of FIG. 2A, in accordance with some example embodiments.

FIG. 2B illustrates the glasses 200 from the perspective of a user. For clarity, a number of the elements shown in FIG. 2A have been omitted. As described in FIG. 2A, the glasses 200 shown in FIG. 2B include left optical element 208 and right optical element 210 secured within the left optical element holder 204 and the right optical element holder 206 respectively.

The glasses 200 include forward optical assembly 230 comprising a right projector 232 and a right near eye display 234, and a forward optical assembly 238 including a left projector 240 and a left near eye display 244.

In some examples, the near eye displays are waveguides. The waveguides include reflective or diffractive structures (e.g., gratings and/or optical elements such as mirrors, lenses, or prisms). Light 236 emitted by the projector 232 encounters the diffractive structures of the waveguide of the near eye display 234, which directs the light towards the right eye of a user to provide an image on or in the right optical element 210 that overlays the view of the real world seen by the user. Similarly, light 242 emitted by the projector 240 encounters the diffractive structures of the waveguide of the near eye display 244, which directs the light towards the left eye of a user to provide an image on or in the left optical element 208 that overlays the view of the real world seen by the user. The combination of a GPU, the forward optical assembly 230, the left optical element 208, and the right optical element 210 provide an optical engine of the glasses 200. The glasses 200 use the optical engine to generate an overlay of the real world view of the user including display of a 3D user interface to the user of the glasses 200.

It will be appreciated however that other display technologies or configurations may be utilized within an optical engine to display an image to a user in the user's field of view. For example, instead of a projector 232 and a waveguide, an LCD, LED or other display panel or surface may be provided.

In use, a user of the glasses 200 will be presented with information, content and various 3D user interfaces on the near eye displays. As described in more detail herein, the user can then interact with the glasses 200 using a touchpad 226 and/or the buttons 228, voice inputs or touch inputs on an associated device (e.g., client device 328 illustrated in FIG. 3), and/or hand movements, locations, and positions detected by the glasses 200.

Figure 3:
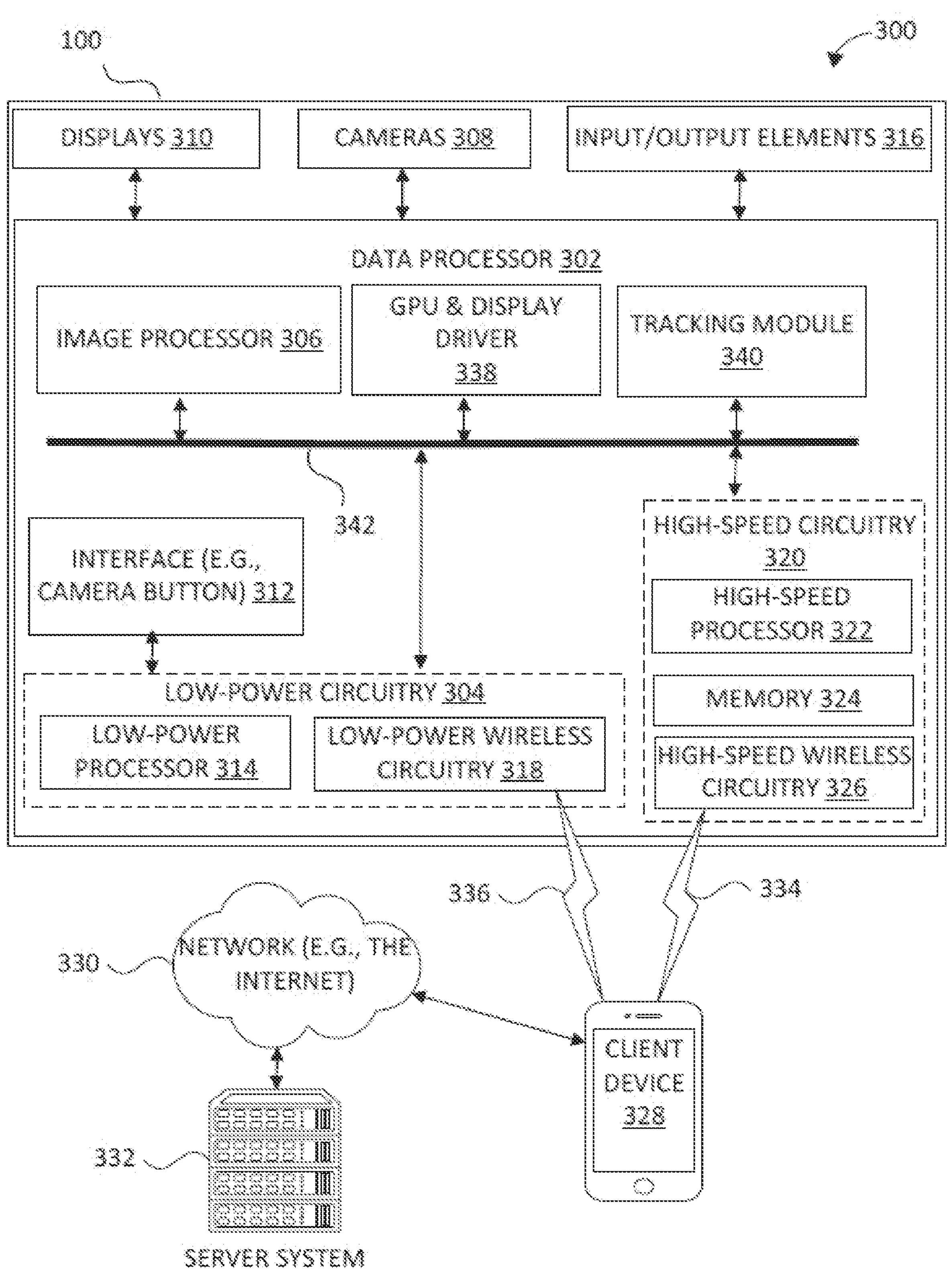
FIG. 3 is a block diagram illustrating a networked system including details of the head-worn device of FIG. 1, in accordance with some example embodiments.

FIG. 3 is a block diagram illustrating a networked system 300 including details of the glasses 200, in accordance with some examples. The networked system 300 includes the glasses 200, a client device 328, and a server system 332. The client device 328 may be a smartphone, tablet, phablet, laptop computer, access point, or any other such device capable of connecting with the glasses 200 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 1306 or the machine 1400 described in FIG. 13 and FIG. 14 respectively.

The glasses 200 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 13 and FIG. 14. For example, the input/output elements 316 may include any of I/O components 1418 including output components 1426, motion components 1434, and so forth. Examples of the displays 310 are discussed in FIG. 2B. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 200. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent standalone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 200. For example, the tracking module 340 uses image data and corresponding inertial data from the cameras 308 and the position components 1438, as well as GPS data, to track a location and determine a pose of the glasses 200 relative to a frame of reference (e.g., real-world environment). The tracking module 340 continually gathers and uses updated sensor data describing movements of the glasses 200 to determine updated three-dimensional poses of the glasses 200 that indicate changes in the relative position and orientation relative to physical objects in the real-world environment. The tracking module 340 permits visual placement of virtual objects relative to physical objects by the glasses 200 within the field of view of the user via the displays 310.

The GPU & display driver 338 may use the pose of the glasses 200 to generate frames of virtual content or other content to be presented on the displays 310 when the glasses 200 are functioning in a traditional augmented reality mode. In this mode, the GPU & display driver 338 generates updated frames of virtual content based on updated three-dimensional poses of the glasses 200, which reflect changes in the position and orientation of the user in relation to physical objects in the user's real-world environment.

One or more functions or operations described herein may also be performed in an application resident on the glasses 200 or on the client device 328, or on a remote server. The glasses 200 may be a stand-alone client device that is capable of independent operation or may be a companion device that works with a primary device to offload intensive processing and/or exchange data over the network 106 with the presentation server system 108. The glasses 200 may also be communicatively coupled with a companion device such as a smart watch and may be configured to exchange data with the companion device. The glasses 200 may further include various components common to mobile electronic devices such as smart glasses or smart phones (for example, including a display controller for controlling display of visual media on a display mechanism incorporated in the device).

Figure 4:
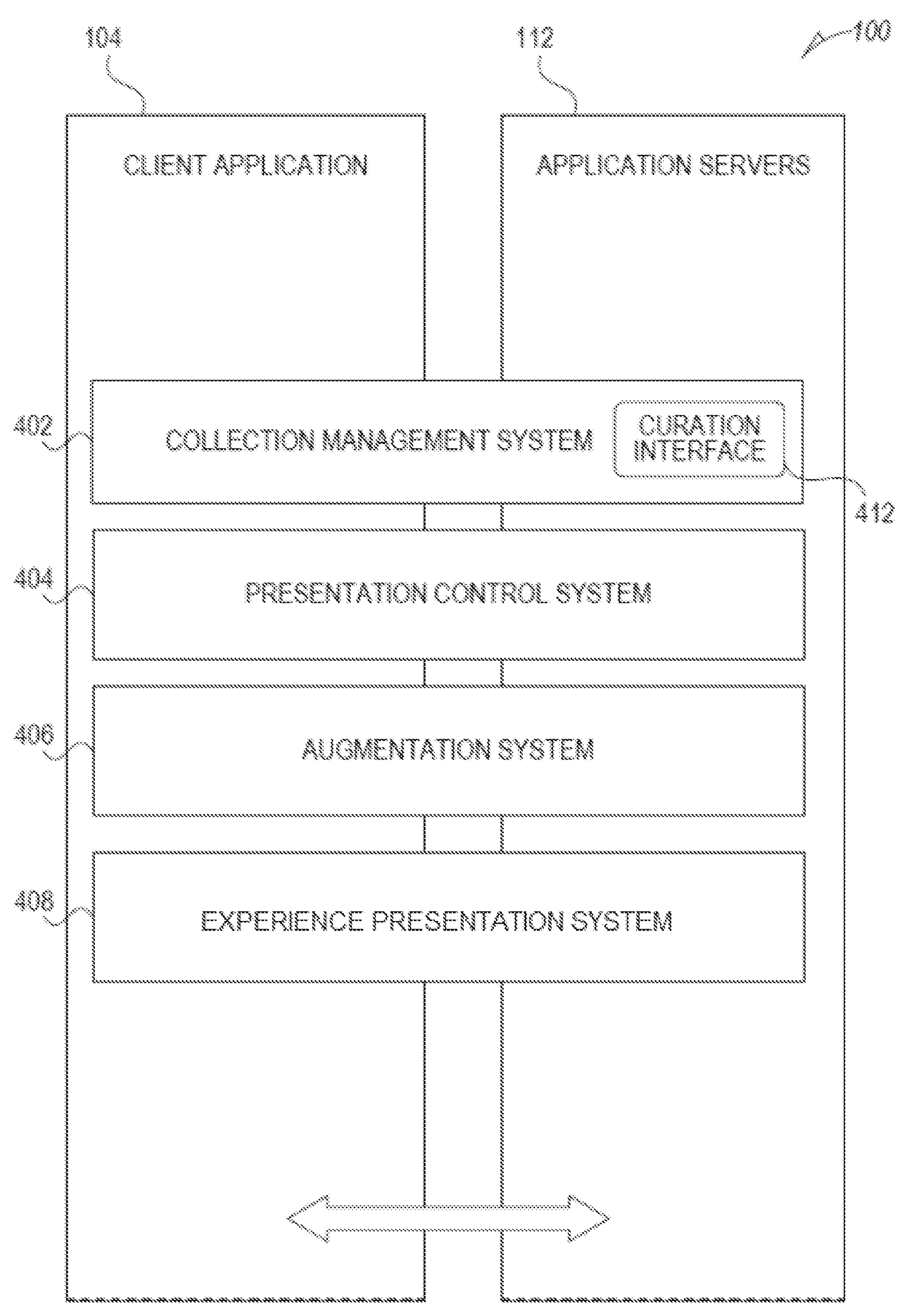
FIG. 4 is a diagrammatic representation of the volumetric content presentation system, in accordance with some examples, that has both client-side and server-side functionality.

FIG. 4 is a block diagram illustrating further details regarding the volumetric content presentation system 100, according to some examples. Specifically, the volumetric content presentation system 100 is shown to comprise the presentation client 104 and the application servers 112. The volumetric content presentation system 100 embodies a number of subsystems, which are supported on the client-side by the presentation client 104 and on the sever-side by the application servers 112. These subsystems include, for example, a collection management system 402, a presentation control system 404, an augmentation system 406, and an experience presentation system 408.

The collection management system 402 is responsible for managing sets or collections of content (e.g., collections of text, image, video, and audio data). A collection of content may be organized into an "event gallery" or an "event story." Such a collection may be made available for a specified time period, such as the duration of an event to which the content relates. For example, content relating to a music concert may be made available as a "story" for the duration of that music concert. The collection management system 402 may also be responsible for publishing an icon that provides notification of the existence of a particular collection to the user interface of the presentation client 104.

The collection management system 402 furthermore includes a curation interface 412 that allows a collection manager to manage and curate a particular collection of content. For example, the curation interface 412 enables an event organizer to curate a collection of content relating to a specific event (e.g., delete inappropriate content or redundant messages). Additionally, the collection management system 402 employs machine vision (or image recognition technology) and content rules to automatically curate a content collection.

The presentation control system 404 is responsible for facilitating and controlling volumetric content presentation. As such, the presentation control system 404 provides a mechanism that allows users to specify control operations for controlling volumetric content presentation. Control operations may, for example, include: a stop operation to stop the presentation; a pause operation to pause the presentation; a fast-forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow-motion presentation of the volumetric video).

For some embodiments, a user may specify input indicative of a control operation for controlling presentation of volumetric content by providing one or more inputs via one or more I/O components (examples of which are described in further detail below in reference to FIG. 14). For some embodiments, the presentation control system 404 may provide an interactive control interface comprising one or more interactive elements (e.g., virtual buttons) to trigger a control operation and the presentation control system 404 monitors interaction with the interactive interface to detect input indicative of a control operation. For some embodiments, a user may trigger a control operation using a gesture such as a hand or head gesture that can be associated with a specific control operation.

The augmentation system 406 provides various functions that enable a user to augment (e.g., annotate or otherwise modify or edit) media content. For example, the augmentation system 406 provides functions related to the generation, publication, and application of augmentation data such as media overlays (e.g., image filters) to volumetric content. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The augmentation system 406 operatively supplies one or more media overlays to the presentation client 104 based on a geolocation of the client device 102 or based on other information, such as social network information of the user of the client device 102. The media overlays may be stored in the database 120 and accessed through the database server 118.

Filters are an example of media overlays that are displayed as overlaid on an image or video during presentation to a user. Filters may be of various types, including user-selected filters from a set of filters presented to a user by the presentation client 104. Other types of filters include geolocation filters (also known as geo-filters), which may be presented to a user based on geographic location. For example, geolocation filters specific to a neighborhood or special location may be presented within a user interface by the presentation client 104, based on geolocation information determined by a Global Positioning System (GPS) unit of the client device 102.

Another type of filter is a data filter, which may be selectively presented to a user by the presentation client 104, based on other inputs or information gathered by the client device 102. Examples of data filters include current temperature at a specific location, a current speed at which a sending user is traveling, battery life for a client device 102, or the current time.

AR content items are another example of media overlays. An AR content item may be a real-time special effect and/or sound that can be added to an image or a video including volumetric images and videos.

Generally, AR content items, overlays, image transformations, images, and similar terms refer to modifications that may be applied to image data (e.g., videos or images) including volumetric content. This includes real-time modifications, which modify an image as it is captured using device sensors (e.g., one or multiple cameras) of a client device 102 and then displayed by a display device of the client device 102 (e.g., an embedded display of the client device) with the modifications. This also includes modifications to stored content, such as volumetric videos in a gallery or collection that may be modified. For example, in a client device 102 with access to multiple AR content items, a user can use a single volumetric video with multiple AR content items to see how the different AR content items will modify the stored content. For example, multiple augmented reality content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such augmentation systems to modify content using augmentation data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, volumetric videos, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be augmented (e.g., edited), elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh can be used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

The augmentation system 406 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform video and image content can be used by the augmentation system 406 where a neural network operates as part of a presentation client 104 operating on the client device 102. The augmentation system 406 determines the presence of a face within the image or video stream and provides interactive modification elements (e.g., icons) associated with a computer animation model to transform image data, or the computer animation model can be present as associated with an interface described herein. The interactive modification elements include changes that may be the basis for modifying the user's face within the image or video content as part of the modification operation. Once a modification icon is selected, the transform system initiates a process to convert the image of the user to reflect the selected modification icon (e.g., generate a smiling face on the user). Modified image or video content may be presented in a graphical user interface displayed on the client device 102 as soon as the image or video stream is captured, and a specified modification is selected. The augmentation system 406 may implement a complex convolutional neural network on a portion of the image or video content to generate and apply the selected modification. That is, the user may be presented with modified content in real-time or near real-time. Further, the modification may be persistent while the content is being presented. Machine taught neural networks may be used to enable such modifications.

The experience presentation system 408 is responsible for providing presentation of recorded experiences (e.g., a journey). In some examples, the experience presentation system 408 generates and maintains experience data related to an experience of a user. The experience data may describe a real-world environment of the experience and multiple points of interest during the experience. The experience data may further include weather data describing the weather condition of the experience and biometrics of the user generated during the experience. The experience presentation system 408 may then cause a presentation of visual representation of the experience by a display device based on the experience data related to the experience of the user. The visual representation of the experience may include a multi-dimensional representation of the real-world environment and representations of the multiple points of interest overlaid on the multi-dimensional representation of the real-world environment. The real-world environment may be two-dimensional or three-dimensional. The visual representation of the experience may also include a representation of the weather condition and a representation of the biometric data. In some examples, the data may further include perspectives at some or all of the multiple points of interest. The experience presentation system 408 may detect a user selection of a point of interest among the multiple points of interest. In response to the detection, the experience presentation system 408 may cause the display device to switch to a presentation of a corresponding perspective.

Figure 5:
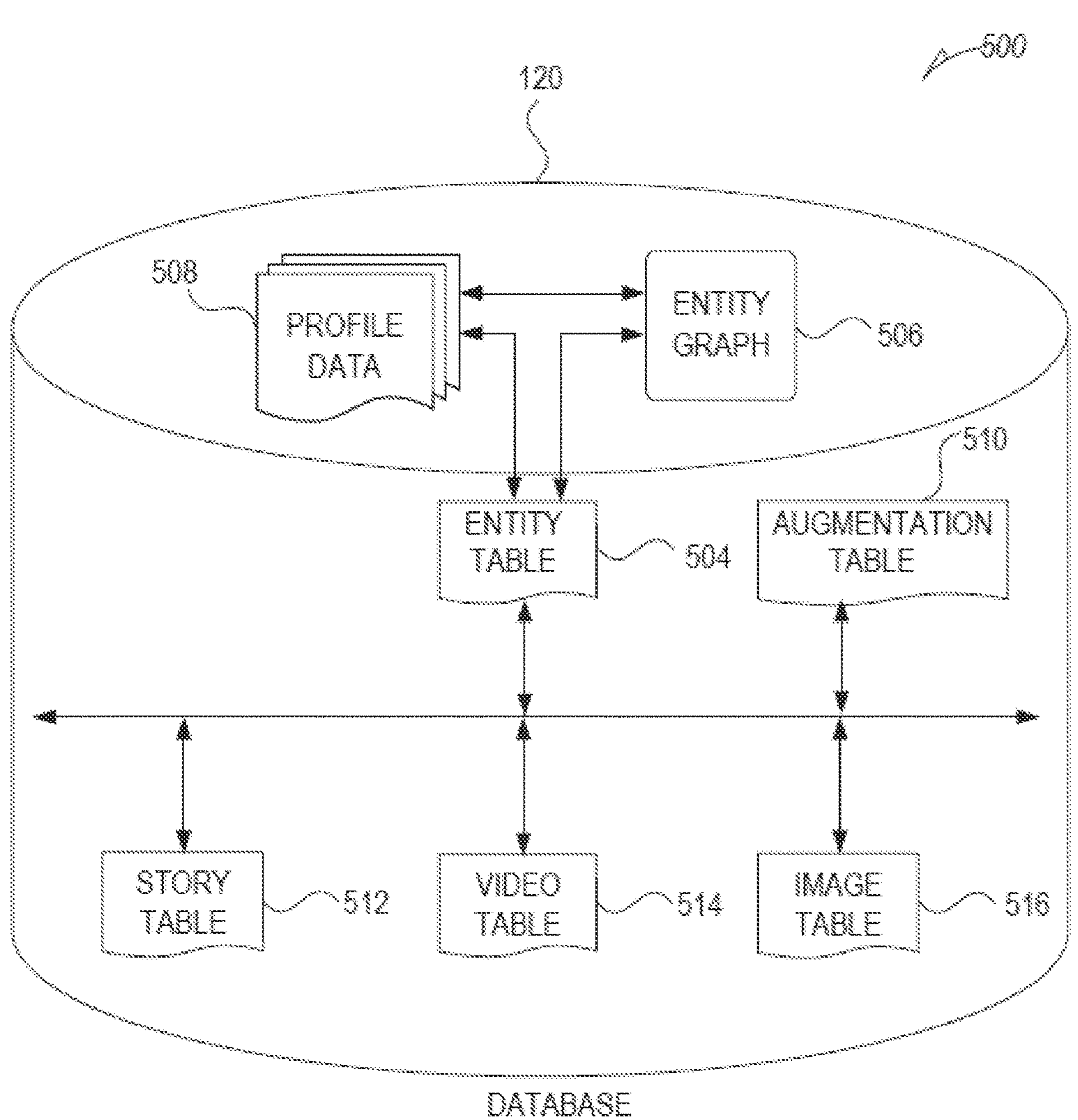
FIG. 5 is a diagrammatic representation of a data structure as maintained in a database, in accordance with some example embodiments.

FIG. 5 is a diagrammatic representation of a data structure 500 as maintained in the database 120, in accordance with some examples. While the content of the database 120 is shown to comprise a number of tables, it will be appreciated that the data could be stored in other types of data structures (e.g., as an object-oriented database).

An entity table 504 stores entity data, and is linked (e.g., referentially) to an entity graph 506 and profile data 508. Entities for which records are maintained within the entity table 504 may include individuals, corporate entities, organizations, objects, places, events, and so forth. Regardless of entity type, any entity regarding which the presentation server system 108 stores data may be a recognized entity. Each entity is provided with a unique identifier, as well as an entity type identifier (not shown). The entity table 504 may associate various augmentations from the augmentation table 510 with various images and videos stored in the image table 516 and the video table 514.

The entity graph 506 stores information regarding relationships and associations between entities. Such relationships may be social, professional (e.g., work at a common corporation or organization) interested-based or activity-based, merely for example.

The profile data 508 stores multiple types of profile data about a particular entity. The profile data 508 may be selectively used and presented to other users of the volumetric content presentation system 100, based on privacy settings specified by a particular entity. Where the entity is an individual, the profile data 508 includes, for example, a user name, telephone number, address, settings (e.g., notification and privacy settings), as well as a user-selected avatar representation (or collection of such avatar representations).

The database 120 also stores augmentation data, such as overlays including AR content items and filters, in an augmentation table 510. The augmentation data is associated with and applied to videos (for which data is stored in a video table 514) and images (for which data is stored in an image table 516) including volumetric videos and images.

A story table 512 stores data regarding collections of content including associated image, video, or audio data that are compiled into a collection (e.g., a story or a gallery). The creation of a particular collection may be initiated by a particular user (e.g., each user for which a record is maintained in the entity table 504). A user may create a "personal story" in the form of a collection of content that has been created and sent/broadcast by that user. To this end, the user interface of the presentation client 104 may include an icon that is user-selectable to enable a sending user to add specific content to his or her personal story.

As mentioned above, the video table 514 stores video data that includes volumetric videos. Similarly, the image table 516 stores image data that that includes volumetric images.

Figure 6:
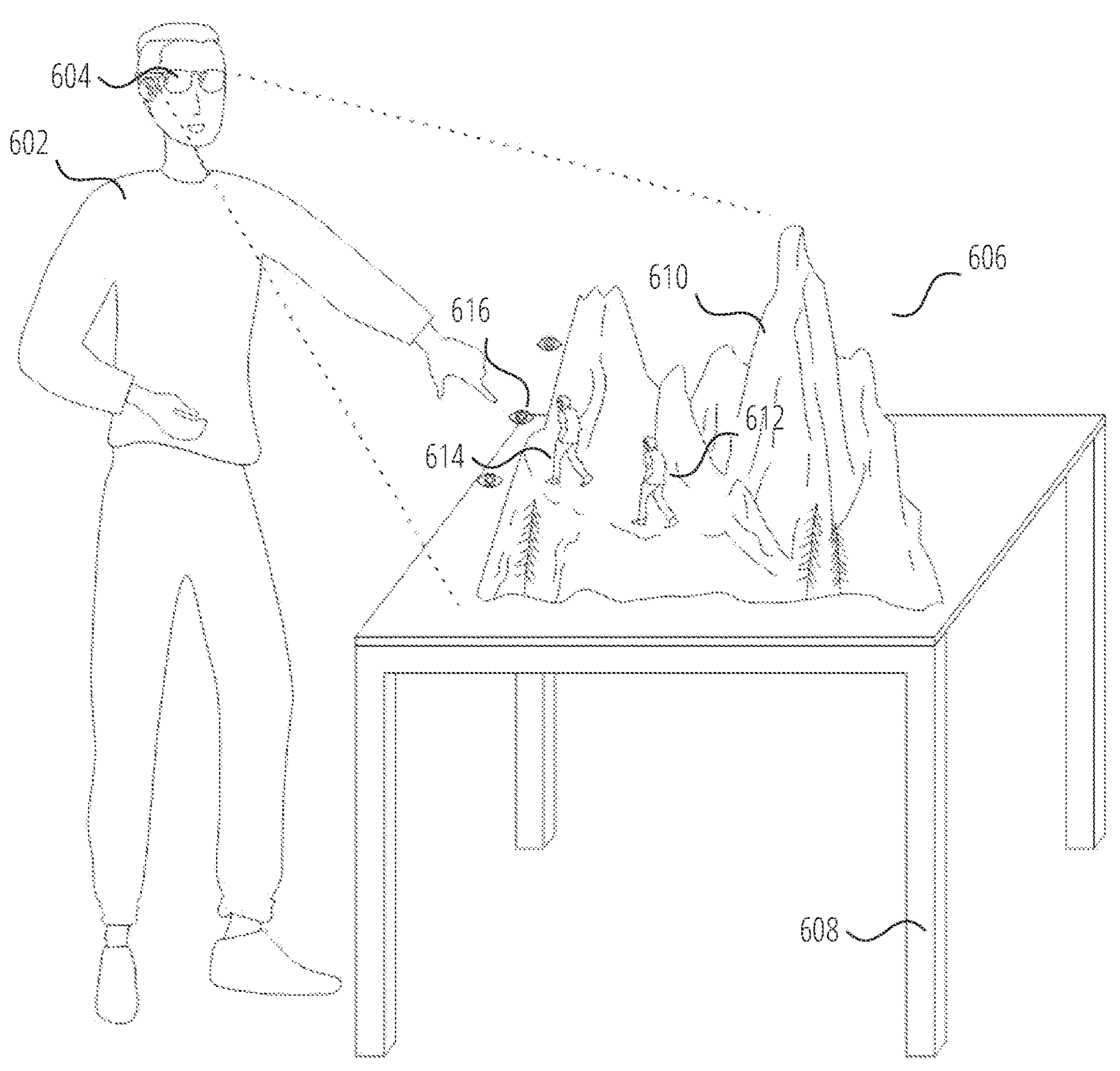
FIG. 6 is a conceptual diagram illustrating an example presentation of a visual representation of an experience by a head-worn device, in accordance with some example embodiments.

FIG. 6 is a conceptual diagram illustrating an example presentation of a visual representation of an experience by a head-worn display device, in accordance with some example embodiments. As shown in FIG. 6, a user 602 may wear a head-worn display device 604 (e.g., glasses 200). In some embodiments, the head-worn display device 604 supports AR experiences. The AR experiences include application of virtual content to real-world environments through presentation of the virtual content by transparent displays through which a real-world environment is visible. For example, the head-worn display device 604 causes a presentation of virtual content 606 overlaid on a real-world object (e.g., table 608). The user 602 may see both the presentation of virtual content 606 and the real-world table 608 through the head-worn display device 604.

The virtual content 606 may correspond to an experience (e.g., a hike) between two friends. During a capture phase, two friends may both wear or carry smart devices (e.g., glasses 200, smart phones) while hiking. Through the hike, the two friends may take videos and pictures using the smart devices and casually hike their way through the mountains. Embedded cameras from the smart devices may capture multiple perspectives of the two friends at different point of interests. The smart devices may further include a drone that also captures multiple perspectives at different points of interest or along the hike. Refer back to FIG. 6, after the hike, the presentation of virtual content 606 may include an AR topographical rendering of the mountain 610 with the path the friends took to reach the summit being visually presented or highlighted. The presentation of virtual content 606 may further include representations the two friends (e.g., miniature avatars 612 and 614).

In some embodiments, the presentation of virtual content 606 further includes presentations of multiple point of interests 616. The multiple point of interests 616 may be determined evenly along the path of the hike or according to the videos and pictures the two friends take. Alternatively, or additionally, the point of interests 616 may be determined based on biometric data (e.g., blood pressure, heart rate, body temperature) of the friends during the hike. For example, any special moments (e.g., seeing an endangered flower or animal, seeing a beautiful scene, facing danger) during the hike may cause the friends' heart rate to increase dramatically. A perspective of the friends at the special moments may be recorded and a relative location and/or latitude where the special moment happens may be recorded and marked on the presentation of virtual content 606 as the point of interests 616. When the user 602 interacts with (e.g., touches, clicks) a representation of one of the point of interests 616, the head-worn display device 604 may switch to a presentation of a recorded perspective associated with the point of interest. Detailed information regarding the method for the switch of presentation can be found in FIG. 11 and the descriptions thereof. Example presentation of a recorded perspective associated with the point of interest can be found in FIG. 7 and the descriptions thereof. In some embodiments, the user 602 may click anywhere on the path to view a video taken at that point from any smart devices (e.g., a drone) during the hike.

It should be noted that the presentation of virtual content 606 is merely an example and shall not be limiting. Any other components disclosed elsewhere in the present application may be integrated in the presentation of virtual content 606. For example, the presentation of virtual content 606 may include a virtual control panel (e.g., the virtual control panel 706). In response to detecting an input indicative of the interaction with the control panel, the head-worn display device 604 can present the visual representation of the users (e.g., miniature avatars 612 and 614) at a location corresponding to a desired progress of the experience corresponding to the input indicative of the interaction.

Figure 7:
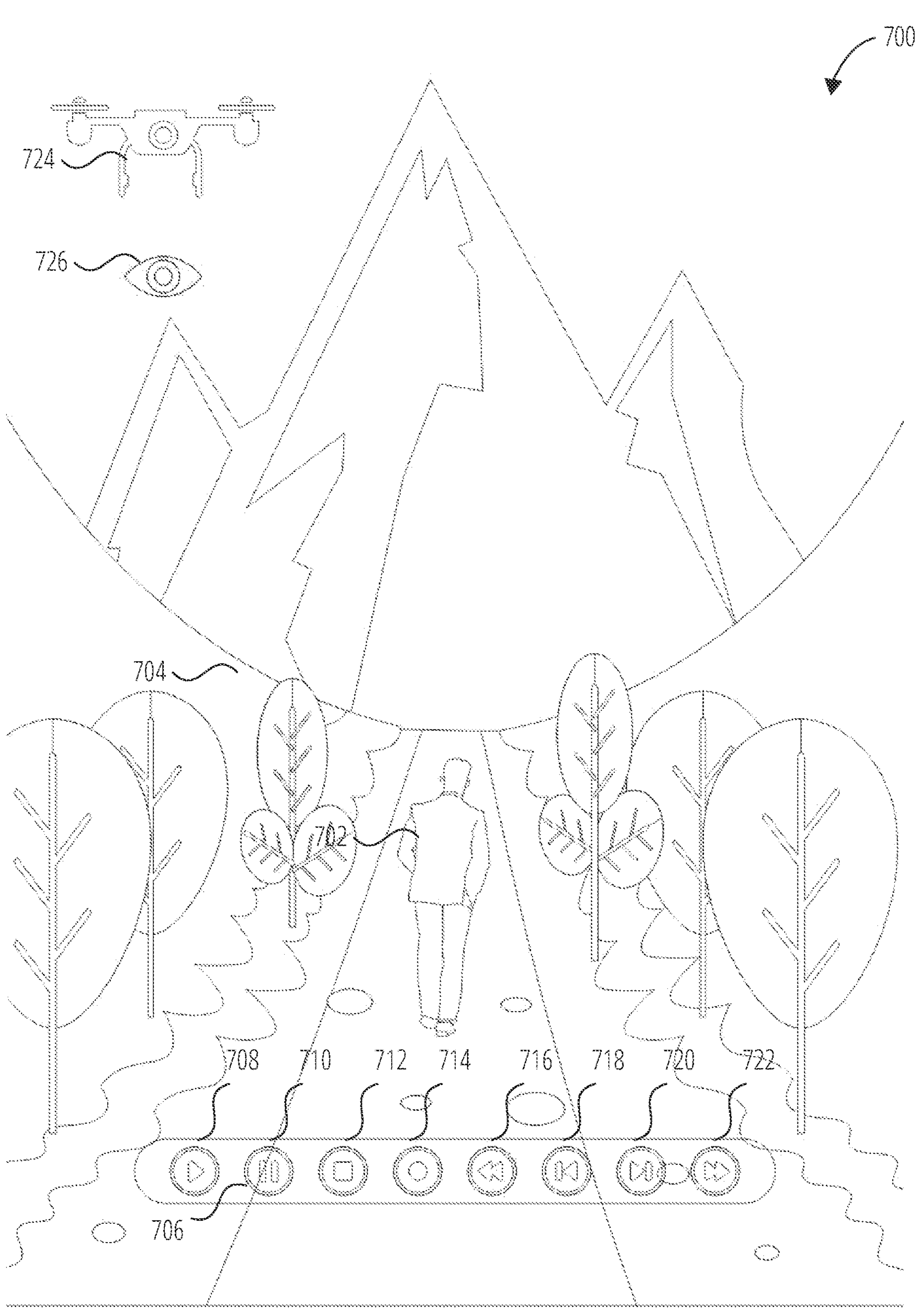
FIG. 7 is a conceptual diagram illustrating an example presentation of a recorded perspective associated with a point of interest, in accordance with some example embodiments.

FIG. 7 is a conceptual diagram illustrating an example presentation 700 of a recorded perspective associated with a point of interest, in accordance with some example embodiments. The presentation 700 corresponds to a perspective taken by a smart device of one of the two hikers (e.g., hiker of miniature avatar 612 that walks behind). The hiker 702 in the presentation 700 corresponds to the hiker of miniature avatar 614 in FIG. 6. The mountain 704 is an example of the mountain 610. The recorded perspective in presentation 700 may be a static picture or a captured video. The presentation 700 may further include a virtual control panel 706. When a display device (e.g., head-worn display device 604) or a sensor device thereof detects input indicative of a user interaction with the control panel 706, the display device may control or alter the presentation 700 based on the detected input indicative of the user interaction with the control panel 706. The virtual control panel 706 may include multiple virtual buttons, such as a virtual play button 708, a virtual pause button 710, a virtual stop button 712, a virtual record button 714, a virtual rewind button 716, a virtual previous button 718, a virtual next button 720, and a virtual fast forward button. In response to an input indicative of a user interaction (e.g., a touch, hold, or click) with the virtual play button 708, the display device may switch to a presentation of a captured video associated with presentation 700 of the recorded perspective. In response to an input indicative of a user interaction with the virtual pause button 710, the display device may pause the presentation of the captured video. In response to an input indicative of a user interaction with the virtual stop button 712, the display device may switch back to a default presentation 700 (e.g., a static picture) of the recorded perspective. In response to an input indicative of a user interaction with the virtual record button 714, the display device may record the currently displayed static picture or captured video. The recording may last for a predetermined time duration, e.g., 10 seconds, 30 seconds, 1 minute, 5 minutes, or last until the user interacts with the virtual stop button 712. When the recording is finished, the display device may transmit the recording to a user device of the user or a server, or store the recording on a storage medium. In response to an input indicative of a user interaction with the virtual rewind button 716, the display device may rewind a presentation of a captured video. The presentation of the captured video may be rewound for a preset time duration, e.g., 5 seconds, 10 seconds, or 20 seconds. Alternatively, the presentation of the captured video may be rewound until the user stops interacting with (releases from) the virtual rewind button 716. In response to an input indicative of a user interaction with the virtual previous button 718, the display device may switch to a presentation of a recorded perspective of a previous point of interest. Similarly, in response to an input indicative of a user interaction with the virtual next button 720, the display device may switch to a presentation of a recorded perspective of the next point of interest. In response to an input indicative that a user interacts with the virtual fast-forward button 722, the display device may fast-forward a presentation of a captured video.

It should be noted that the virtual buttons 708-722 are examples and shall not be limiting. Persons in the field may modify, add, or delete buttons without departing from the spirit of the present application. Such modification, addition, or deletion is within the protection scope of the present application. In a case that the recorded perspective is associated with static pictures only, the virtual buttons 708-716, and 722 may be omitted. In some embodiments, a smart device (e.g., a drone) may take static pictures or capture videos during the experience (e.g., the hike between two friends). The presentation 700 of recorded perspective may further include a virtual symbol 724 of the smart device and a virtual interactive icon 726. When a user interacts with the virtual interactive icon 726, the display device may switch to a presentation of a recorded perspective taken by the smart device.

Figure 8:
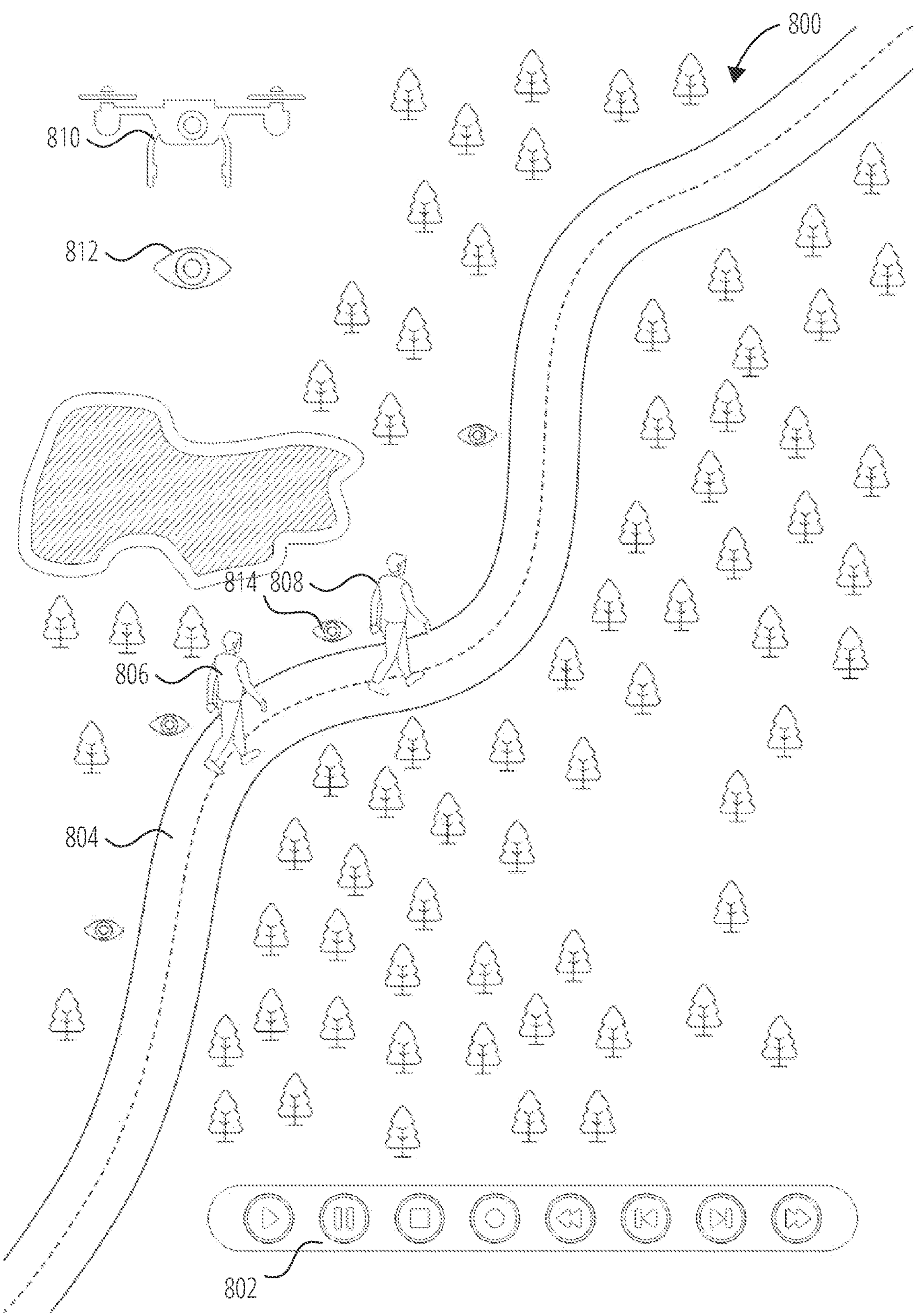
FIG. 8 is a conceptual diagram illustrating an example 2-dimensional (2D) presentation of a visual representation of an experience, in accordance with some example embodiments.
Figure 9:
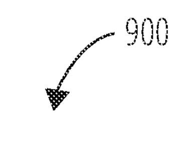
FIGS. 9-12 are flowcharts illustrating example methods for presenting an experience using AR, in accordance with some example embodiments.
Figure 9:
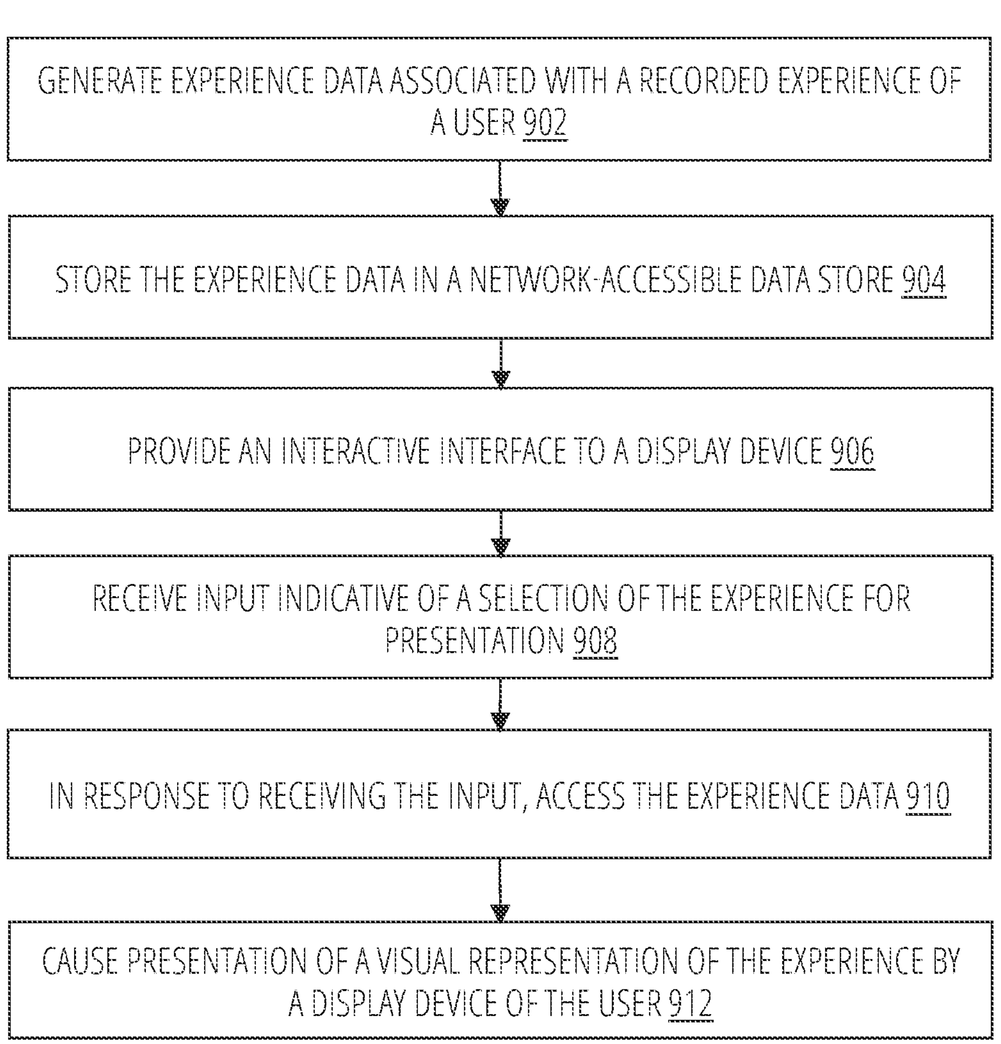

FIG. 8 is a conceptual diagram illustrating an example 2-dimensional (2D) presentation 800 of a visual representation of an experience, in accordance with some example embodiments. Similar to the presentation of virtual content 606 in FIG. 6, the 2D presentation 800 may be presented by a head-worn display device (e.g., head-worn display device 604, glasses 200) as an AR topographical rendering of an experience between two people (e.g., a hike between two friends). In examples in which there is no altitude change during the experience, the head-worn display device may present the experience via a 2D representation. In other examples, the head-worn display device may present the experience in a 3D representation. Alternatively, or additionally, the user can specify whether the head-worn display device presents the experience via a 2D or a 3D representation. The presentation 800 may include a path of the experience, representations of the two people (e.g., miniature avatars 806 and 808), other topographical information (e.g., trees, roads, lakes), a virtual symbol 810 of a smart device, a representation 812 corresponding to a perspective of the smart device, multiple representations 814 corresponding to points of interests during the experience. The smart device may include a smart phone, a smart wristband, a smart watch, smart glasses, a camera mounted on a hand-held stick, a smart helmet, a drone, or the like. The following descriptions take a drone as an example of the smart device but it shall not be limiting. When a user interacts with (e.g., touches, clicks) a representation 814 of one of the points of interest, the head-worn display device may switch to a presentation of a recorded perspective associated with the point of interest. When a user interacts with a representation 812 corresponding to the perspective of the drone, the head-worn display device may switch to a presentation of a recorded perspective associated taken by the drone. The 2D presentation 800 may further include a virtual control panel 802. In response to detecting an input indicative of the interaction with the virtual control panel 802, the display device may present the visual representation of the user at a location in the real-world environment corresponding to the desired progress of the experience. The detailed functions of the virtual buttons on the virtual control panel 802 are similar to the virtual buttons 708-722 on the virtual control panel 706, except the virtual control panel 802 is used to control the progress of the experience (e.g., the locations of the miniature avatars 806 and 808). For example, when a user interacts with (e.g., presses) the virtual play button, the display device causes a presentation that includes a slow and continuous change of locations of the miniature avatars 806 and 808, reflecting the movements of the two people during the real-world experience. When a user interacts with (e.g., presses) the virtual fast forward button, the display device causes a presentation that includes a greater change of locations (faster movements) of the miniature avatars 806 and 808.

FIGS. 9-12 are flowcharts illustrating example methods for presenting an experience using AR, in accordance with some example embodiments.

The method 900 may be embodied in computer-readable instructions for execution by one or more processors such that the operations of the method 900 may be performed in part or in whole by the functional components of the volumetric content presentation system 100; accordingly, the method 900 is described below by way of example with reference thereto. However, it shall be appreciated that at least some of the operations of the method 900 may be deployed on various other hardware configurations than the volumetric content presentation system 100.

At operation 902, the volumetric content presentation system 100 generates experience data associated with a recorded experience of a user. The experience data describes aspects of the recorded experience including a first real-world environment of the experience. The experience data further identifies one or more points of interest within the first real-world environment determined based on device data obtained from one or more devices of the user (e.g., location data). Generally, generating the experience data includes obtaining and aggregating data from one or more devices that describe one or more aspects of the experience. The data obtained from the one or more devices can include input data, biometric data, motion data, environment data, and position data, examples of which are discussed below in reference to FIG. 11.

The one or more devices of the user can include a camera device and the generating of the experience data can include obtaining image data from the camera device that includes one or more images (e.g., a video) depicting the experience. In an example, image data can be obtained from an embedded camera of a drone that was used to capture at least a portion of the experience. In another example, image data can be obtained from a wearable device (e.g., glasses 200) that includes one or more images depicting the experience from the perspective of a user of the wearable device. In yet another example, image data can be obtained from a camera device that includes one or more images depicting the experience from a perspective of a point of interest or depicting the point of interest.

For some embodiments, a volumetric capture of the experience is performed and generating the experience data can include obtaining or generating volumetric content based on the volumetric capture. For example, the volumetric content presentation system 100 may generate volumetric content by stitching together various video, image, audio, and sensor data generated through known volumetric capture techniques. The video, image, audio, and sensor data can be provided by the user to the volumetric content presentation system 100, for example, as part of a request for generating volumetric content.

The experience data may further include data generated from other devices and third-party services. In an example, data such as weather data, map data, traffic data, and topological data may be obtained from third-party services and included in the experience data.

Depending on the type and location of the experience, and generating the experience data may also include obtaining data from one or more network-connected devices (e.g., IoT devices).

At operation 904, the volumetric content presentation system 100 stores the experience data in a network-accessible data store (e.g., the database 120). The network-accessible data store may comprise a collection of experience data, which may include experience data of the user as well as other users' experience data who have permitted access by the user.

The volumetric content presentation system 100 provides an interactive interface to a display device (e.g., glasses 200) that allows the user to select recorded experiences for presentation, at operation 906. The volumetric content presentation system 100, at operation 908, receives input indicative of a selection of the experience for presentation. In response to receiving the input, the volumetric content presentation system 100 accesses the experience data, at operation 910.

In operation 912, the volumetric content presentation system 100 causes presentation of a visual representation of the experience by a display device of the user. The visual representation of the experience is rendered based on the experience data. For some embodiments, the experience data may include the visual representation. For some embodiments, the visual representation is generated based on the experience data.

The visual representation of the experience includes a multi-dimensional representation of the first real-world environment and representations of the one or more points of interest presented in conjunction with the multi-dimensional representation of the first real-world environment. The visual representation of the experience may further include a visual representation of the user overlaid on the multi-dimensional representation of the first real-world environment. For some embodiments, the visual representation of the experience comprises a topographical rendering of the first real-world environment. The topographical rendering of the first real-world environment may be generated based on geospatial information, architectural information, or an existing model of the experience. The presentation of the visual representation of the experience includes presenting the multi-dimensional representation of the first real-world environment overlaid on a second real-world environment that is within a field of view of the user of the display device.

As noted above, in some examples, the experience data may include weather data. The weather data describes a weather condition (e.g., a type of weather including rainy, sunny, windy, cloudy, stormy or the like, a parameter of the weather including temperature, humidity, wind level, visibility) of the experience. In these examples, the visual representation of the experience may include a representation of the weather condition overlaid on the multi-dimensional representation of the first real-world environment.

As noted above, in some examples, the experience data includes a recorded perspective associated with a point of interest. Consistent with these examples, the volumetric content presentation system 100 may detect input indicative of an interaction of the user with a representation of the point of interest within the presentation of the visual representation of the experience. The interaction of the user with the representation of the point of interest may correspond to a manual selection of the point of interest. Detecting the interaction may include detecting a gesture of the user directed at a representation of the point of interest, detecting a gaze of the user being directed at the representation of the point of interest, or detecting a motion or movement of the user in a direction of the representation of the point of interest. In response to detecting the input indicative of the interaction of the user with the representation of the point of interest, the volumetric content presentation system 100 causes the display device to switch to a presentation of the recorded perspective associated with the point of interest. The perspective may be recorded by a smart device at the point of interest. The smart device may include a smart phone, a smart wristband, a smart watch, smart glasses, a camera mounted on a hand-held stick, a smart helmet, a drone, or the like.

The volumetric content presentation system 100 may detect input indicative of a control operation associated with the presentation of the visual representation of the experience. The control operation may indicate a desired progress of the presentation of the experience. For some embodiments, the input corresponds to input received from one or more I/O components (examples of which are described in further detail below in reference to FIG. 14) of any one or more of the display device, a primary device to which the display device is a complementary device thereof, or a complementary device (e.g., earphones) in communication with the display device. Consistent with these embodiments, the receiving of the input indicative of the control operation may comprise receiving one or more input signals based on user interaction with one or more I/O components.

For some embodiments, the presentation of visual representation of the experience may include an interactive control interface comprising one or more interactive elements (e.g., virtual buttons) to trigger the control operation and receiving the input may comprise detecting an interaction by the user of the display device with the interactive element of the interactive interface.

For some embodiments, receiving the input indicative of the control operation may comprise detecting a gesture of a user of the display device. For example, a body motion of the user, such as a hand or head gesture, can be associated with a control operation and used by the user to trigger the control operation. Detecting a gesture of a user may, for example, include performing image processing on image data produced by a camera that is communicatively coupled to the display device. Performing image processing to detect hand gestures may include utilizing one or more machine learning models.

In response to detecting the input indicative of the control operation, the volumetric content presentation system 100 may cause the display device to control the presentation of the visual representation of the experience. In an example, controlling the presentation includes presentation a visual representation of the user at a location in the real-world environment corresponding to the desired progress of the experience.

In some examples, the experience data includes biometric data (e.g., blood pressure, heart rate, body temperature) of the user generated during the experience. The visual representation of the experience may include a representation of the biometric data of the user generated during the experience.

In some examples, the volumetric content presentation system 100 may determine a region of interest in the multi-dimensional representation of the real-world environment based on the biometric data. The visual representation of the experience may include a visual enhancement to the region of interest in the multi-dimensional representation of the real-world environment.

In some examples, the experience may be at a constant altitude and the multi-dimensional representation of the scene may include a two-dimensional representation. Alternatively, the experience may include an altitude change and the multi-dimensional representation of the scene includes a three-dimensional representation.

Depending on the embodiment, an operation of the method 900 may be repeated in different ways or involve intervening operations not shown. Though the operations of the method 900 may be depicted and described in a certain order, the order in which the operations are performed may vary among embodiments, including performing certain operations in parallel.

Figure 10:
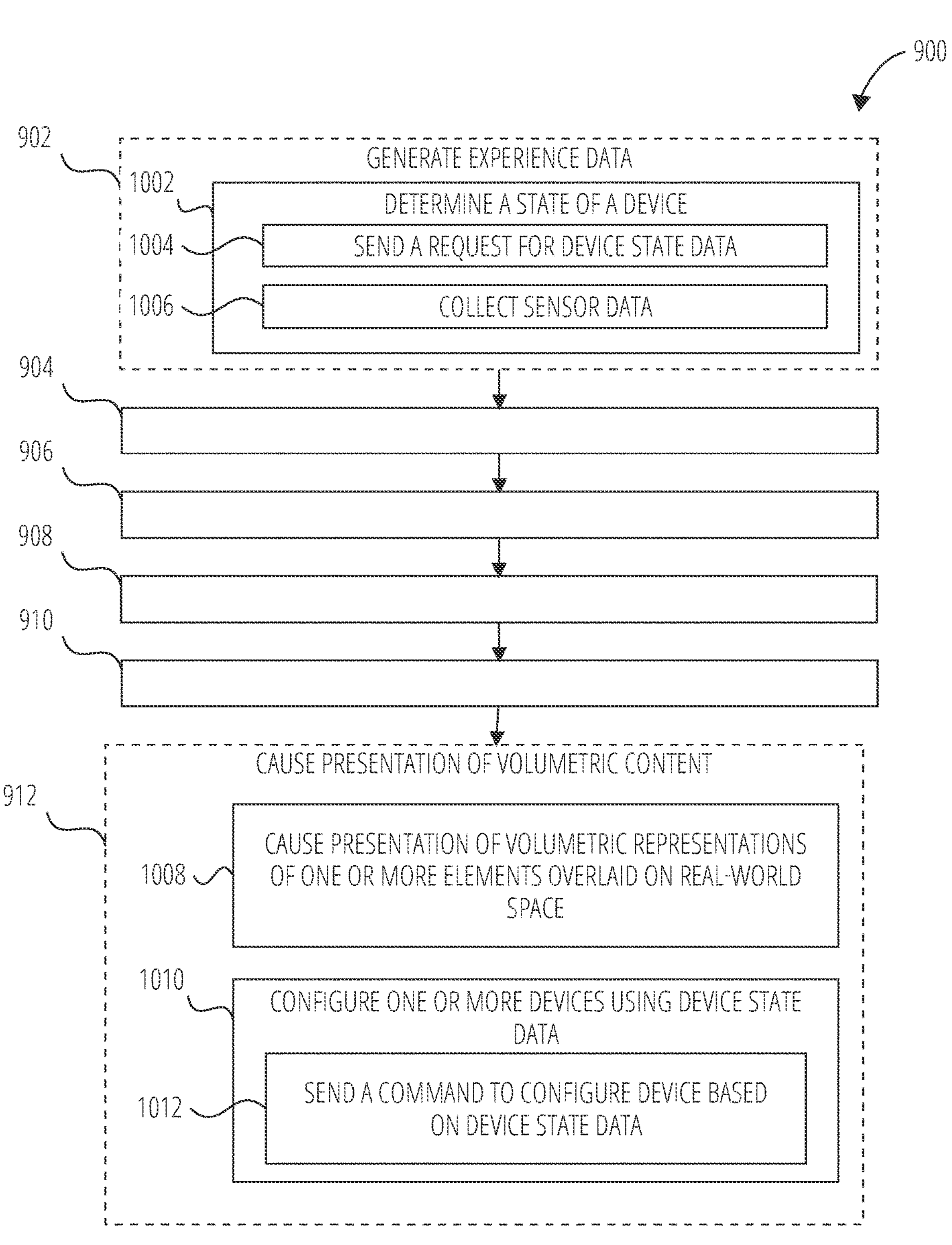

As shown in FIG. 10, the method 900 can, in some embodiments, include operations 1002, 1008, and 1010. Consistent with these embodiments, the operation 1002 can be performed as part of the operation 902 where the volumetric content presentation system 100 generates the experience data. At operation 1002, the volumetric content presentation system 100 determines a state of a network-connected device during the volumetric capture of the user experience. In other words, the volumetric content presentation system 100 determines the state of the network-connected device at the time of capturing the volumetric content. For some devices, the state of a device corresponds to a particular state of the device. For example, the device state data may include one or more device settings of the network-connected device. For some devices, the device state data may include map or location data including, for example, data defining a path or route between two locations. The volumetric content presentation system 100 may determine the state in real-time as the volumetric capture is being performed or subsequent to the volumetric capture. For some devices, the device state data may include altitude, orientation, temperature, humidity, sound of the device.

As shown, in determining the state of the network-connected device, the volumetric content presentation system 100 can perform any one or more of operations 1004 and 1006. At operation 1004, the volumetric content presentation system 100 sends, over a network, a request for the device state data to the network-connected device or a network service associated with the network-connected device (e.g., via an API of the device or the network service). At operation 1006, the volumetric content presentation system 100 collects sensor data from one or more sensors associated with the real-world three-dimensional space. The one or more sensors may, for example, include an embedded sensor of the network-connected device, a sensor that is communicatively coupled with the network-connected device, or a sensor in the real-world three-dimensional space or an associated real-world environment that is capable of sensing one or more aspects of the operation of the network-connected device.

Consistent with these embodiments, the operations 1008 and 1010 can be performed as part of the operation 912 where the volumetric content presentation system 100 causes presentation of volumetric content. At operation 1008, the volumetric content presentation system 100 causes presentation of volumetric representations of one or more elements overlaid on real-world space which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users.

At operation 1010, the volumetric content presentation system 100 configures one or more devices using device state data. As noted above, the device state data can include a state of a network-connected device during the volumetric capture of the user experience. Accordingly, in some instances, configuring the one or more network-connected devices comprises configuring a network-connected device according to a state of the network-connected device during the volumetric capture of the user experience so as to place the device in the same state as when the user experience occurred. Examples of configuring a network-connected device using the device state data include: causing or adjusting a presentation of a 2D or 3D representation of an experience based on a recorded altitude and orientation during the experience; simulating a weather event (using sound and light effects) based on recorded temperature, humidity, sound during the experience; setting a temperature of a smart thermostat; causing a navigation device to display a navigation path; and causing a smart speaker to play a song.

In some embodiments, based on the device state data (e.g., whether there is an altitude change during the experience), the volumetric content presentation system 100 may determine whether to present the experience via a 2D or 3D representation. Alternatively, or additionally, the user can choose whether the volumetric content presentation system presents the experience via a 2D or 3D representation.

Consistent with these embodiments, the operation 1012 can be performed as part of the operation 1012 where the volumetric content presentation system 100 configures the one or more network-connected devices. At operation 1012, the volumetric content presentation system 100 sends a command, over the network, to the network-connected device or the network service associated with the network-connected device to configure the device according to the state of the device at the time of capturing the volumetric content, such that the network-connected device is configured with the same state as when the user experience occurred. As noted above, the state of the device may comprise one or more device settings, and thus configuring the network-connected device can include applying the one or more device settings to the network-connected device.

Figure 11:
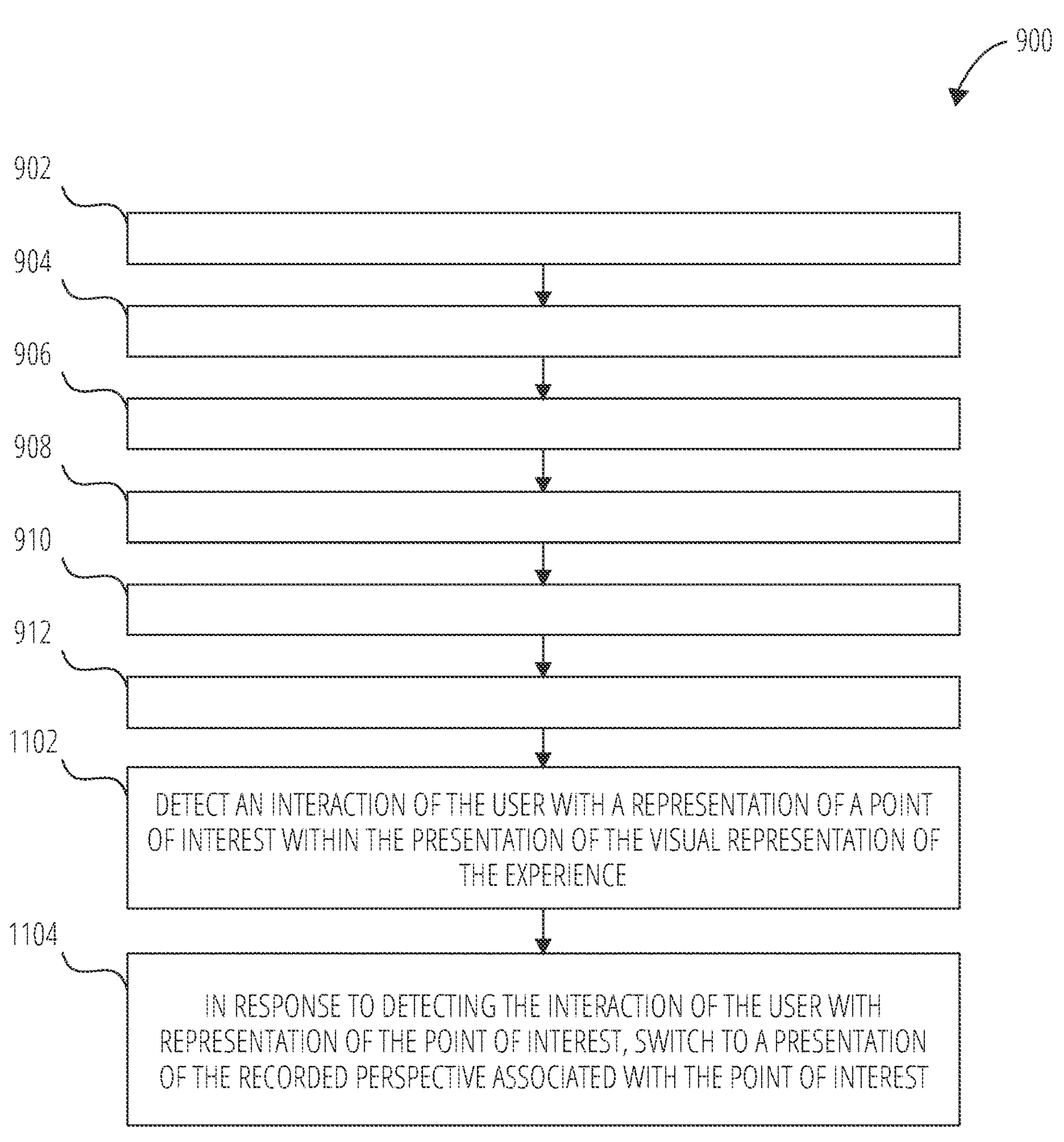

As shown in FIG. 11, the method 900 can, in some embodiments, further include operations 1102 and 1104. As noted above, the presentation of the visual representation of the experience may include multiple representations of point of interests (e.g., representations 616, 726, 812, and 814) during the experience, taken by the user device or a drone. At operation 1102, the volumetric content presentation system 100 detects interaction of the user with (touching, holding, clicking on) a representation of the point of interests. In response to detecting the interaction of the user with the representation of the point of interest, the volumetric content presentation system 100 switches, at operation 1104, to a presentation of the recorded perspective associated with the point of interest. The recorded perspective including image data depicting a portion of the real-world environment during the experience that is visible from the point of interest.

Figure 12:
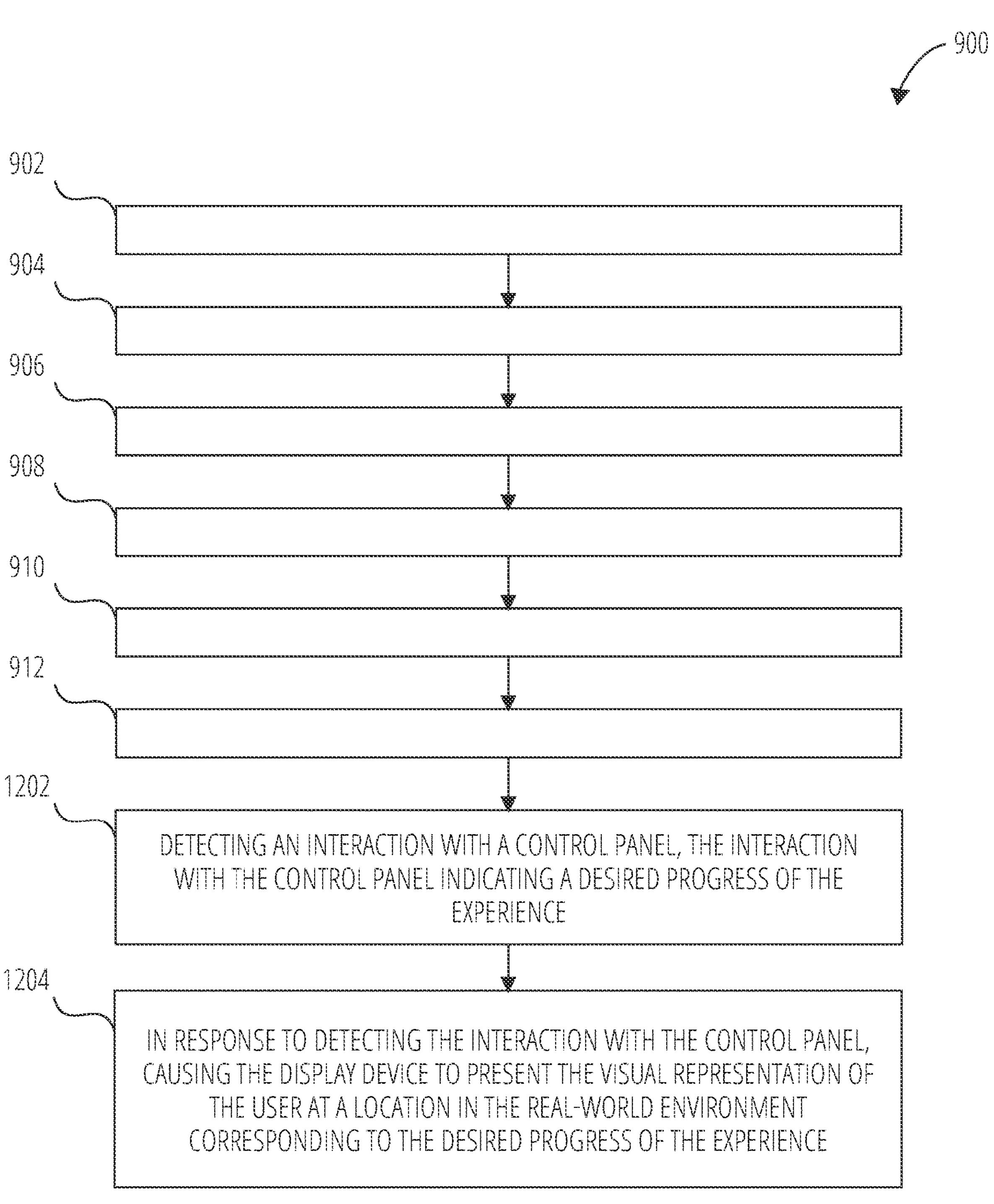

As shown in FIG. 12, the method 900 can, in some embodiments, further include operations 1202 and 1204. As noted above, the presentation of the visual representation of the experience may include a presentation of a control panel (e.g., virtual control panel 802). At operation 1202, the volumetric content presentation system 100 detects an interaction with the control panel that indicates a target progress of the experience. The interaction may include direct interaction with (e.g., touches, holds, clicks) a virtual button on the control panel to move a visual representation of a user to a desired location in the visual representation of the experience. In some embodiments, the interaction can include directly interacting with (e.g., dragging or moving) the visual representation of the user to the desired location in the visual representation of the experience. In response to detecting the interaction with the control panel, the volumetric content presentation system 100 causes, at operation 1204, the display device to present the visual representation of the user at a location in the real-world environment corresponding to the desired progress of the experience. For example, if the user clicks on a play button on the control panel, the volumetric content presentation system 100 causes visual representations of two hikers (e.g., miniature avatars 806 and 808) to move from a start point (foot of a mountain) to a destination (top of the mountain). The user may interact with (e.g., click on) a rewind button on the control panel to cause the visual representations of two hikers to move backwards.

Software Architecture

Figure 13:
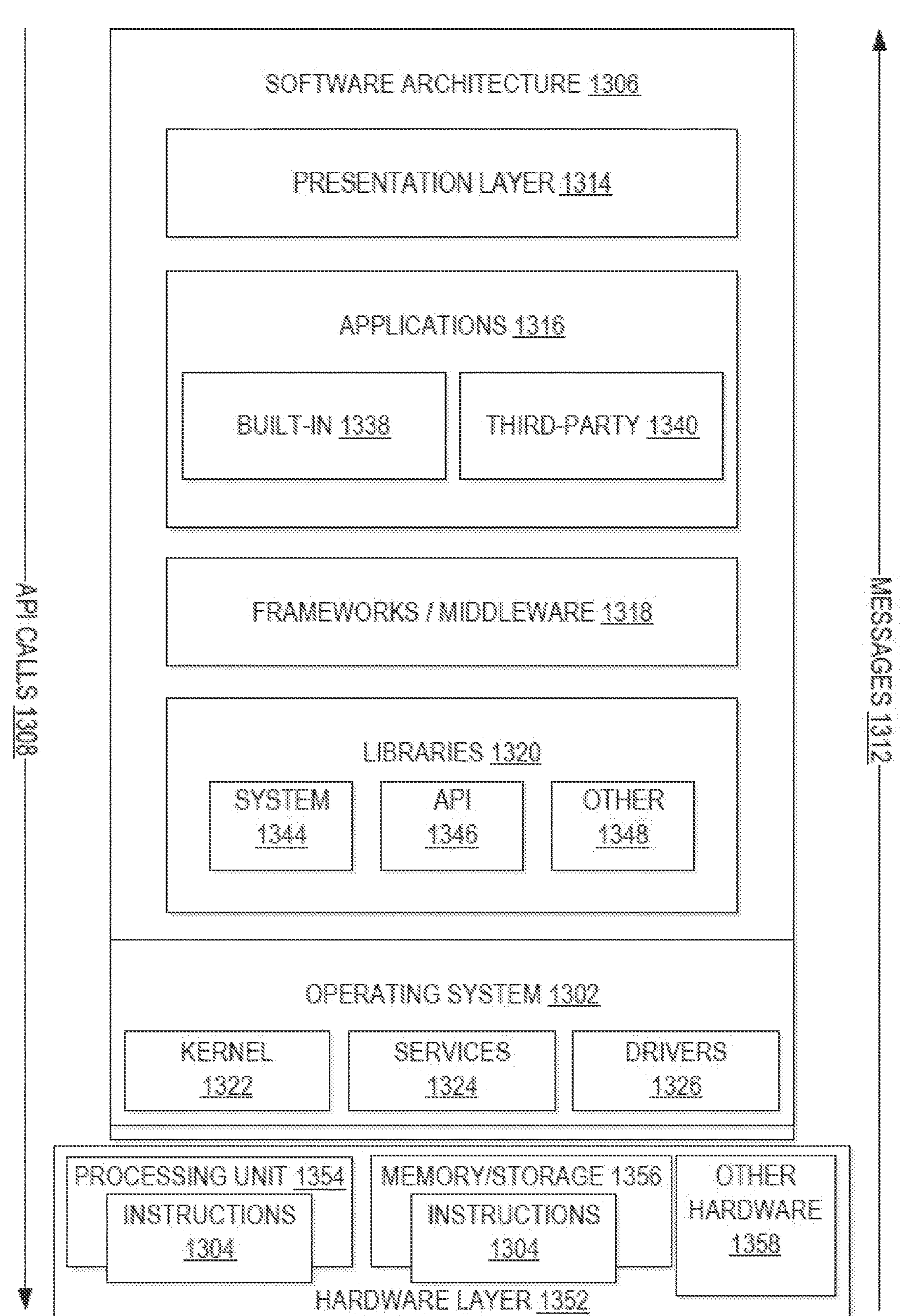
FIG. 13 is a block diagram illustrating a representative software architecture, which may be used in conjunction with various hardware architectures herein described, in accordance with some example embodiments.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors 1404, memory/storage 1406, and I/O components 1418. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes memory and/or storage modules 1356, which also have the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response to the API calls 1308 as messages 1312. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various GUI functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems interactions with a user may occur through a presentation layer, such as the presentation layer 1314. In these systems, the application/component "logic" can be separated from the aspects of the application/component that interact with a user.

Figure 14:
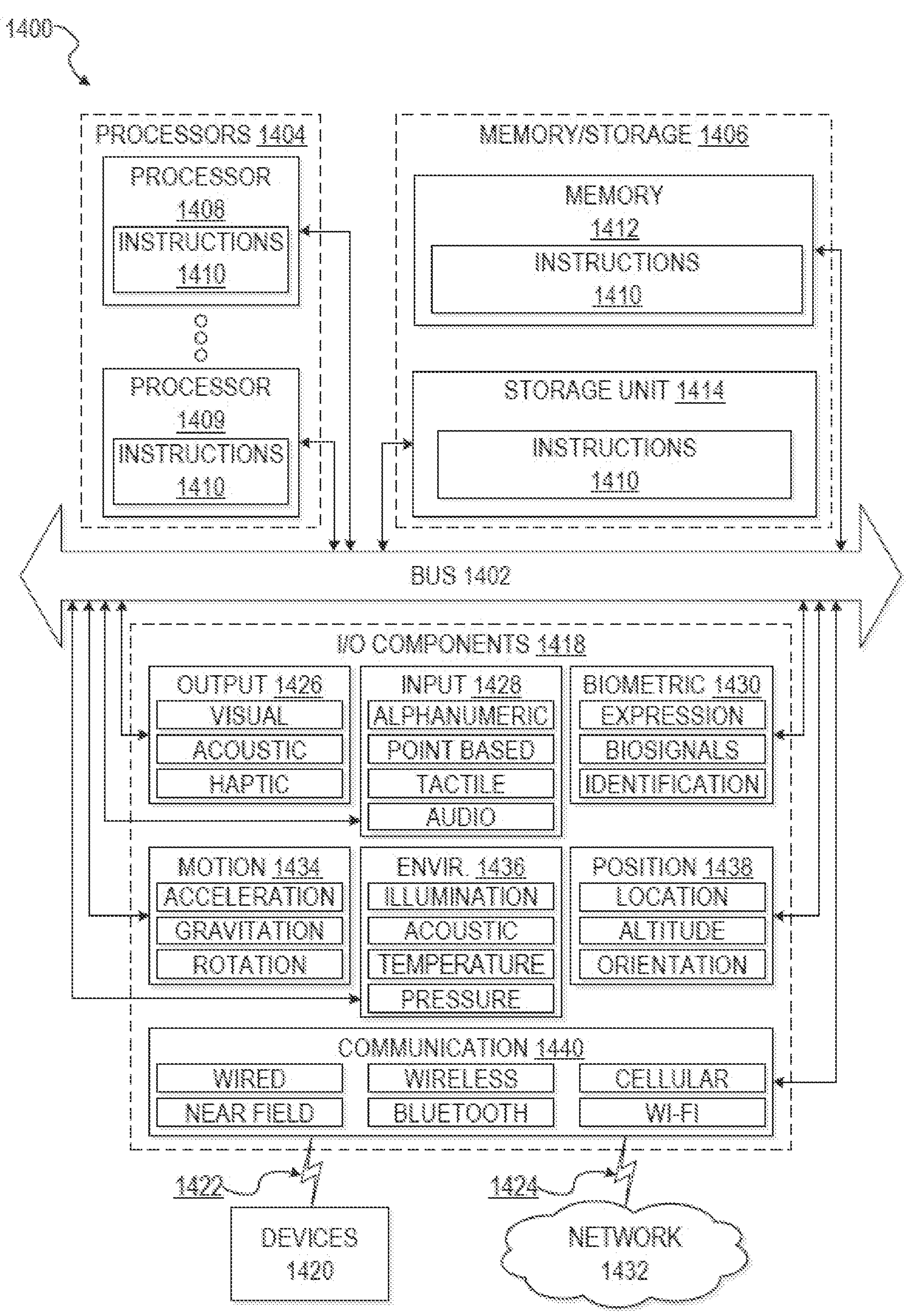
FIG. 14 is a block diagram illustrating components of a machine able to read instructions from a machine-readable medium (e.g., a machine-readable storage medium) and perform any one or more of the methodologies discussed herein, in accordance with some example embodiments.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. In an example embodiment, the processors 1404 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1408 and a processor 1409 that may execute the instructions 1410. Although FIG. 14 shows multiple processors 1404, the machine 1400 may include a single processor with a single core, a single processor with multiple cores (e.g., a multi-core processor), multiple processors with a single core, multiple processors with multiple cores, or any combination thereof.

The memory/storage 1406 may include a memory 1412, such as a main memory, or other memory storage, and a storage unit 1414, both accessible to the processors 1404 such as via the bus 1402. The storage unit 1414 and memory 1412 store the instructions 1410 embodying any one or more of the methodologies or functions described herein. The instructions 1410 may also reside, completely or partially, within the memory 1412, within the storage unit 1414, within at least one of the processors 1404 (e.g., within the processor's cache memory), or any suitable combination thereof, during execution thereof by the machine 1400. Accordingly, the memory 1412, the storage unit 1414, and the memory of the processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion, and the grouping is in no way limiting. In various example embodiments, the I/O components 1418 may include output components 1426 and input components 1428. The output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1418 may include biometric components 1430, motion components 1434, environment components 1436, or position components 1438, among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Expressions and identifications may include user data and thus are only stored locally on user devices, unless the user requests otherwise. The user data may be deleted regularly or upon the user's request. Alternatively, the user data is immediately deleted from the user devices after a processing result is generated based on the user data. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The U/O components 1418 may include communication components 1440 operable to couple the machine 1400 to a network 1432 or devices 1420 via a coupling 1424 and a coupling 1422, respectively. For example, the communication components 1440 may include a network interface component or other suitable device to interface with the network 1432. In further examples, the communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling.

In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:

generating experience data of a recorded experience of a user, the experience data describing a first real-world environment of the recorded experience, wherein the experience data comprises recorded perspectives associated with at least one point of interest, each recorded perspective comprising image data depicting a portion of the first real-world environment visible from a corresponding point of interest, the recorded perspectives being captured by a capture device of one or more devices of the user during the experience;

identifying at least one point of interest associated with the first real-world environment of the recorded experience by:

monitoring biometric data of the user during the recorded experience;

detecting changes in the biometric data between successive time periods during the experience;

determining a physiological response of the user during the experience based on the detected changes in the biometric data transgressing a predetermined threshold value at a temporal location and detecting an object in the recorded perspective when the physiological response of the user is determined; and designating the temporal location as the at least one point of interest, wherein the recorded perspective associated with the at least one point of interest comprise the object; and causing presentation, by a display device of the one or more devices of the user, of a visual representation of the recorded experience overlaid on a second real-world environment that is within a field of view of the user, the visual representation of the experience comprising a representation of the first real-world environment and representations of the one or more points of interest displayed in conjunction with the representation of the first real-world environment, wherein representations of the at least one point of interest are each selectable to cause the display device to switch to a corresponding presentation of the recorded perspective associated with the selected point of interest, the presentation of the recorded perspective comprising the object.

2. The method of claim 1, further comprising:

detecting input indicative of an interaction of the user with a representation of the at least one point of interest within the presentation of the visual representation of the experience associated with the temporal location; and in response to detecting the input indicative of the interaction of the user with the representation of the point of interest associated with the temporal location, causing the display device to switch to a presentation of the recorded perspective associated with the point of interest.

3. The method of claim 1, wherein the image data comprises one or more images generated by a drone at the point of interest.

4. The method of claim 1, wherein the image data comprises one or more images generated by a mobile device of the user at the point of interest.

5. The method of claim 1, wherein the at least one point of interest are determined based in part on location data from a device associated with the experience.

6. The method of claim 1, wherein the visual representation of the experience comprises a representation of a control panel and the experience includes a timespan, the method further comprising:

detecting input indicative of an interaction with the control panel, the interaction with the control panel indicating a desired progress of the experience during the timespan; and in response to detecting the input indicative of the interaction with the control panel, causing the display device to present the visual representation of the user at a location in the first real-world environment corresponding to the desired progress of the experience.

7. The method of claim 1, wherein;

the experience data further comprises weather data describing a weather condition of the experience; and the visual representation of the experience comprises a representation of the weather condition.

8. The method of claim 1, wherein:

the visual representation of the experience comprises a representation of the biometric data generated during the experience.

9. The method of claim 1, wherein:

the experience is at a constant altitude; and the representation of the first real-world environment includes a two-dimensional representation.

10. The method of claim 1, wherein:

the experience includes an altitude change; and the representation of the first real-world environment includes a three-dimensional representation.

11. The method of claim 1, wherein:

the experience data further comprises volumetric content generated based on a volumetric capture of the recorded experience; and the visual representation of the experience is generated based on the volumetric content.

12. The method of claim 1, wherein:

the generating of the experience data comprises aggregating data from the one or more devices of the user, the one or more devices include at least one camera device, the data from the one or more devices includes image data from the at least one camera device, and the image data depicts at least a portion of the first real-world environment.

13. A system comprising:

one or more processors; and at least memory storing instructions that, when executed by the one or more processors, configure the system to perform operations comprising:

generating experience data of a recorded experience of a user, the experience data describing a first real-world environment of the recorded experience, wherein the experience data comprises recorded perspectives associated with at least one point of interest, each recorded perspective comprising image data depicting a portion of the first real-world environment visible from a corresponding point of interest, the recorded perspectives being captured by a capture device of one or more devices of the user during the experience;

identifying at least one point of interest associated with the first real-world environment of the recorded experience by:

monitoring biometric data of the user during the recorded experience;

detecting changes in the biometric data between successive time periods during the experience;

determining a physiological response of the user during the experience based on the detected changes in the biometric data transgressing a predetermined threshold value at a temporal location and detecting an object in the recorded perspective when the physiological response of the user is determined; and designating the temporal location as the at least one point of interest, wherein the recorded perspective associated with the at least one point of interest comprise the object; and causing presentation, by a display device of the one or more devices of the user, of a visual representation of the recorded experience overlaid on a second real-world environment that is within a field of view of the user, the visual representation of the experience comprising a representation of the first real-world environment and representations of the one or more points of interest displayed in conjunction with the representation of the first real-world environment, wherein representations of the at least one point of interest are each selectable to cause the display device to switch to a corresponding presentation of the recorded perspective associated with the selected point of interest, the presentation of the recorded perspective comprising the object.

14. The system of claim 13, wherein the operations further comprise:

detecting input indicative of an interaction of the user with a representation of the at least one point of interest within the presentation of the visual representation of the experience associated with the temporal location; and in response to detecting the input indicative of the interaction of the user with the representation of the point of interest associated with the temporal location, causing the display device to switch to a presentation of the recorded perspective associated with the point of interest.

15. The system of claim 13, wherein the visual representation of the experience comprises a representation of a control panel and the experience includes a timespan, the operations further comprising:

detecting input indicative of an interaction with the control panel, the interaction with the control panel indicating a desired progress of the experience during the timespan; and in response to detecting the input indicative of the interaction with the control panel, causing the display device to present the visual representation of the user at a location in the first real-world environment corresponding to the desired progress of the experience.

16. The system of claim 13, wherein:

the experience data further comprises weather data describing a weather condition of the experience; and the visual representation of the experience comprises a representation of the weather condition.

17. The system of claim 13, wherein the at least one point of interest are determined based in part on location data from a device associated with the experience.

18. A non-transitory computer-readable storage medium, the computer-readable storage medium including instructions that when executed by a computer, cause the computer to perform operations comprising:

generating experience data of a recorded experience of a user, the experience data describing a first real-world environment of the recorded experience, wherein the experience data comprises recorded perspectives associated with at least one point of interest, each recorded perspective comprising image data depicting a portion of the first real-world environment visible from a corresponding point of interest, the recorded perspectives being captured by a capture device of one or more devices of the user during the experience;

identifying at least one point of interest associated with the first real-world environment of the recorded experience by:

monitoring biometric data of the user during the recorded experience;

detecting changes in the biometric data between successive time periods during the experience;

determining a physiological response of the user during the experience based on the detected changes in the biometric data transgressing a predetermined threshold value at a temporal location and detecting an object in the recorded perspective when the physiological response of the user is determined; and designating the temporal location as the at least one point of interest, wherein the recorded perspective associated with the at least one point of interest comprise the object; and causing presentation, by a display device of the one or more devices of the user, of a visual representation of the recorded experience overlaid on a second real-world environment that is within a field of view of the user, the visual representation of the experience comprising a representation of the first real-world environment and representations of the one or more points of interest displayed in conjunction with the representation of the first real-world environment, wherein representations of the at least one point of interest are each selectable to cause the display device to switch to a corresponding presentation of the recorded perspective associated with the selected point of interest, the presentation of the recorded perspective comprising the object.

* * * * *